United States Patent
Li et al.

(10) Patent No.: US 7,719,208 B2
(45) Date of Patent: May 18, 2010

(54) COLOR CONTROL METHOD FOR LED LIGHTING SYSTEMS

(75) Inventors: Yueh-Han Li, Hsin-Chu (TW); Po-Tang Hsu, Hsin-Chu (TW); Chien-Ming Ko, Hsin-Chu (TW); Hung-Ching Li, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 345 days.

(21) Appl. No.: 12/023,042

(22) Filed: Jan. 31, 2008

(65) Prior Publication Data

US 2009/0153075 A1 Jun. 18, 2009

(30) Foreign Application Priority Data

Dec. 12, 2007 (TW) .............................. 96147400 A

(51) Int. Cl.
H05B 37/02 (2006.01)

(52) U.S. Cl. .................. 315/307; 315/294; 315/312

(58) Field of Classification Search ............ 315/185 R, 315/247, 291, 294, 297, 299, 302, 307–309, 315/312, 360

See application file for complete search history.

(56) References Cited

U.S. PATENT DOCUMENTS

| | | | |
|---|---|---|---|
| 6,441,558 B1 | 8/2002 | Muthu | |
| 7,067,995 B2 | 6/2006 | Gunter | |
| 7,208,713 B2 | 4/2007 | Ishiguchi | |
| 7,423,389 B2* | 9/2008 | Lee | 315/308 |
| 7,489,089 B2* | 2/2009 | Gandhi | 315/291 |
| 7,649,326 B2* | 1/2010 | Johnson et al. | 315/291 |
| 2002/0030455 A1 | 3/2002 | Ghanem | |
| 2003/0102819 A1 | 6/2003 | Min | |
| 2004/0052076 A1 | 3/2004 | Mueller | |
| 2005/0187450 A1 | 8/2005 | Chew | |
| 2006/0082529 A1 | 4/2006 | Oyama | |
| 2006/0261754 A1 | 11/2006 | Lee | |
| 2007/0035538 A1 | 2/2007 | Garcia | |
| 2007/0159421 A1 | 7/2007 | Peker | |
| 2009/0079362 A1* | 3/2009 | Shteynberg et al. | 315/294 |
| 2009/0108772 A1* | 4/2009 | Teng et al. | 315/294 |
| 2009/0218960 A1* | 9/2009 | Lyons et al. | 315/297 |

* cited by examiner

Primary Examiner—Douglas W Owens
Assistant Examiner—Tung X Le
(74) Attorney, Agent, or Firm—Winston Hsu

(57) ABSTRACT

When temperature variation occurs to the LED dice of an LED lighting system, a feedback control mechanism is applied to compensate temperature-related wavelength shift for precisely controlling the light generated by the LED dice based on the voltage drop variation or current variation of the LED dice. The color control method for the LED lighting system includes a preliminary detection phase and a feedback control phase. In the preliminary detection phase, voltage drop signals or current signals together with corresponding color and hue signals of each LED module of the LED lighting system are detected. In the feedback control phase, signal compensating processes are performed to precisely control the light generated by the LED lighting system based on the voltage drop variation or the current variation in conjunction with the corresponding color and hue signals generated in the preliminary detection phase.

25 Claims, 11 Drawing Sheets

COLOR CONTROL METHOD FOR LED LIGHTING SYSTEMS

BACKGROUND OF THE INVENTION

1. Field of the Invention

The present invention relates to a color control method, and more particularly, to a color control method for LED lighting systems.

2. Description of the Prior Art

Due to lightweight, small size, low power consumption and high-bright lighting capability, light emitting diodes (LEDs) are now in widespread use, including a variety of indication applications, indoor or outdoor lighting applications, vehicle auxiliary lighting applications, camera flashlights, and so forth. In particular, the designs of backlights for different display panels are switched from traditional cold cathode fluorescent lamps (CCFLs) or external electrode fluorescent lamps (EEFLs) to LED lighting modules gradually. While the LED lighting modules are applied to devise the backlights for different display panels, corresponding control methods for the LED lighting modules are required to control the luminance and chromaticity of light outputs for achieving high-quality visual appearances.

FIG. 1 is a functional block diagram schematically showing a prior-art LED lighting system 100. The LED lighting system 100 comprises an LED module 101, an LED driving circuit 111, a color sensor 180, and a controller 150. The LED driving circuit 111 is utilized to provide a driving signal to the LED module 101. The color sensor 180 detects the light emitted from the LED module 101 for generating a feedback signal. The controller 150 generates a control signal based on the feedback signal. Then, the LED driving circuit 111 is capable of regulating the driving signal based on the control signal so that the LED module 101 is able to generate the light having desired luminance and chromaticity.

However, when the operating temperature of the LED dice of the LED module 101 is rising, wavelength shifts will occur to the light emitted from the LED module 101 accordingly. The prior-art LED lighting system 100 is not able to compensate the wavelength shifts in response to temperature variations. That is, the control accuracy concerning the luminance and chromaticity of the light generate by the LED module 101 is getting worse as the operating temperature of the LED dice of the LED module 101 rises.

SUMMARY OF THE INVENTION

In accordance with an embodiment of the present invention, a color control method for an LED lighting system is provided. The LED lighting system comprises a red LED module, a green LED module, and a blue LED module. The color control method comprises: providing a first driving current to the red LED module during a first interval; generating a first feedback voltage corresponding to the red LED module based on a first voltage drop corresponding to the red LED module, and generating a first red light signal, a first green light signal, a first blue light signal, and a first set of CIE tristimulus values corresponding to the red LED module through detecting light emitted from the red LED module at a first time of the first interval; generating a second feedback voltage corresponding to the red LED module based on a second voltage drop corresponding to the red LED module, and generating a second red light signal, a second green light signal, a second blue light signal, and a second set of CIE tristimulus values corresponding to the red LED module through detecting light emitted from the red LED module at a second time of the first interval; providing a second driving current to the green LED module during a second interval; generating a first feedback voltage corresponding to the green LED module based on a first voltage drop corresponding to the green LED module, and generating a first red light signal, a first green light signal, a first blue light signal, and a first set of CIE tristimulus values corresponding to the green LED module through detecting light emitted from the green LED module at a first time of the second interval; generating a second feedback voltage corresponding to the green LED module based on a second voltage drop corresponding to the green LED module, and generating a second red light signal, a second green light signal, a second blue light signal, and a second set of CIE tristimulus values corresponding to the green LED module through detecting light emitted from the green LED module at a second time of the second interval; providing a third driving current to the blue LED module during a third interval; generating a first feedback voltage corresponding to the blue LED module based on a first voltage drop corresponding to the blue LED module, and generating a first red light signal, a first green light signal, a first blue light signal, and a first set of CIE tristimulus values corresponding to the blue LED module through detecting light emitted from the blue LED module at a first time of the third interval; generating a second feedback voltage corresponding to the blue LED module based on a second voltage drop corresponding to the blue LED module, and generating a second red light signal, a second green light signal, a second blue light signal, and a second set of CIE tristimulus values corresponding to the blue LED module through detecting light emitted from the blue LED module at a second time of the third interval; providing the first driving current to the red LED module, providing the second driving current to the green LED module, and providing the third driving current to the blue LED module; generating a third feedback voltage corresponding to the red LED module based on a third voltage drop corresponding to the red LED module; generating a third set of CIE tristimulus values corresponding to the red LED module based on the third feedback voltage, the first feedback voltage, the second feedback voltage, the first set of CIE tristimulus values, and the second set of CIE tristimulus values corresponding to the red LED module; generating a third red light signal, a third green light signal, and a third blue light signal corresponding to the red LED module based on the third feedback voltage, the first feedback voltage, the second feedback voltage, the first red light signal, the first green light signal, the first blue light signal, the second red light signal, the second green light signal, the second blue light signal corresponding to the red LED module; generating a third feedback voltage corresponding to the green LED module based on a third voltage drop corresponding to the green LED module; generating a third set of CIE tristimulus values corresponding to the green LED module based on the third feedback voltage, the first feedback voltage, the second feedback voltage, the first set of CIE tristimulus values, and the second set of CIE tristimulus values corresponding to the green LED module; generating a third red light signal, a third green light signal, and a third blue light signal corresponding to the green LED module based on the third feedback voltage, the first feedback voltage, the second feedback voltage, the first red light signal, the first green light signal, the first blue light signal, the second red light signal, the second green light signal, the second blue light signal corresponding to the green LED module; generating a third feedback voltage corresponding to the blue LED module based on a third voltage drop corresponding to the blue LED module; generating a third set of CIE tristimulus values corresponding to the blue LED module based on the third feedback voltage, the first feedback voltage, the second feedback voltage, the first set of CIE tristimulus values, and the second set of CIE tristimulus values corresponding to the blue LED module; generating a third red light signal, a third green light signal, and a third blue light signal corresponding to the blue LED module based on the third feedback voltage, the first feedback voltage, the second feedback voltage, the first red light signal, the first green light signal, the first blue light signal, the second red light signal, the second green light signal, the second blue light signal corresponding to the blue LED module; calculating a first coefficient matrix based on the third set of CIE tristimulus values, the third red light signal, the third green light signal, and the third blue light signal corresponding to the red LED module, the third set of CIE tristimulus values, the third red light signal, the third green light signal, and the third blue light signal corresponding to the green LED module, and the third set of CIE tristimulus values, the third red light signal, the third green light signal, and the third blue light signal corresponding to the blue LED module; calculating a first control signal, a second control signal, and a third control signal based on the first coefficient matrix and a set of preset CIE tristimulus values; and regulating the first driving current based on the first control signal, regulating the second driving current based on the second control signal, and regulating the third driving current based on the third control signal; wherein the first interval, the second interval, and the third interval are not overlapped between each other.

In accordance with another embodiment of the present invention, a color control method for an LED lighting system is provided. The LED lighting system comprises a red LED module, a green LED module, and a blue LED module. The color control method comprises: providing a first driving voltage to the red LED module during a first interval; generating a first feedback voltage corresponding to the red LED module based on a first current flowing through the red LED module, and generating a first set of CIE tristimulus values corresponding to the red LED module through detecting light emitted from the red LED module at a first time of the first interval; generating a second feedback voltage corresponding to the red LED module based on a second current flowing through the red LED module, and generating a second set of CIE tristimulus values corresponding to the red LED module through detecting light emitted from the red LED module at a second time of the first interval; providing a second driving voltage to the green LED module during a second interval; generating a first feedback voltage corresponding to the green LED module based on a first current flowing through the green LED module, and generating a first set of CIE tristimulus values corresponding to the green LED module through detecting light emitted from the green LED module at a first time of the second interval; generating a second feedback voltage corresponding to the green LED module based on a second current flowing through the green LED module, and generating a second set of CIE tristimulus values corresponding to the green LED module through detecting light emitted from the green LED module at a second time of the second interval; providing a third driving voltage to the blue LED module during a third interval; generating a first feedback voltage corresponding to the blue LED module based on a first current flowing through the blue LED module, and generating a first set of CIE tristimulus values corresponding to the blue LED module through detecting light emitted from the blue LED module at a first time of the third interval; generating a second feedback voltage corresponding to the blue LED module based on a second current flowing through the blue LED module, and generating a second set of CIE tristimulus values corresponding to the blue LED module through detecting light emitted from the blue LED module at a second time of the third interval; providing the first driving voltage to the red LED module, providing the second driving voltage to the green LED module, and providing the third driving voltage to the blue LED module; generating a third feedback voltage corresponding to the red LED module based on a third current flowing through the red LED module; generating a third set of CIE tristimulus values corresponding to the red LED module based on the third feedback voltage, the first feedback voltage, the second feedback voltage, the first set of CIE tristimulus values, and the second set of CIE tristimulus values corresponding to the red LED module; generating a third feedback voltage corresponding to the green LED module based on a third current flowing through the green LED module; generating a third set of CIE tristimulus values corresponding to the green LED module based on the third feedback voltage, the first feedback voltage, the second feedback voltage, the first set of CIE tristimulus values, and the second set of CIE tristimulus values corresponding to the green LED module; generating a third feedback voltage corresponding to the blue LED module based on a third current flowing through the blue LED module; generating a third set of CIE tristimulus values corresponding to the blue LED module based on the third feedback voltage, the first feedback voltage, the second feedback voltage, the first set of CIE tristimulus values, and the second set of CIE tristimulus values corresponding to the blue LED module; calculating a first duty cycle control signal, a second duty cycle control signal, and a third duty cycle control signal based on the third set of CIE tristimulus values corresponding to the red LED module, the third set of CIE tristimulus values corresponding to the green LED module, the third set of CIE tristimulus values corresponding to the blue LED module, and a set of preset CIE tristimulus values; and regulating the first driving voltage based on the first duty cycle control signal, regulating the second driving voltage based on the second duty cycle control signal, and regulating the third driving voltage based on the third duty cycle control signal; wherein the first interval, the second interval, and the third interval are not overlapped between each other.

In accordance with the other embodiment of the present invention, a color control method for an LED lighting system is provided. The LED lighting system comprises a red LED module, a green LED module, and a blue LED module. The color control method comprises: providing a first driving current to the red LED module during a first interval; generating a first feedback voltage corresponding to the red LED module based on a first voltage drop corresponding to the red LED module, and generating a first set of CIE tristimulus values corresponding to the red LED module through detecting light emitted from the red LED module at a first time of the first interval; generating a second feedback voltage corresponding to the red LED module based on a second voltage drop corresponding to the red LED module, and generating a second set of CIE tristimulus values corresponding to the red LED module through detecting light emitted from the red LED module at a second time of the first interval; providing a second driving current to the green LED module during a second interval; generating a first feedback voltage corresponding to the green LED module based on a first voltage drop corresponding to the green LED module, and generating a first set of CIE tristimulus values corresponding to the green LED module through detecting light emitted from the green LED module at a first time of the second interval; generating a second feedback voltage corresponding to the green LED module based on a second voltage drop corresponding to the green LED module, and generating a second set of CIE tristimulus values corresponding to the green LED module through detecting light emitted from the green LED module at a second time of the second interval; providing a third driving current to the blue LED module during a third interval; generating a first feedback voltage corresponding to the blue LED module based on a first voltage drop corresponding to the blue LED module, and generating a first set of CIE tristimulus values corresponding to the blue LED module through detecting light emitted from the blue LED module at a first time of the third interval; generating a second feedback voltage corresponding to the blue LED module based on a second voltage drop corresponding to the blue LED module, and generating a second set of CIE tristimulus values corresponding to the blue LED module through detecting light emitted from the blue LED module at a second time of the third interval; providing the first driving current to the red LED module, providing the second driving current to the green LED module, and providing the third driving current to the blue LED module; generating a third feedback voltage corresponding to the red LED module based on a third voltage drop corresponding to the red LED module; generating a third set of CIE tristimulus values corresponding to the red LED module based on the third feedback voltage, the first feedback voltage, the second feedback voltage, the first set of CIE tristimulus values, and the second set of CIE tristimulus values corresponding to the red LED module; generating a third feedback voltage corresponding to the green LED module based on a third voltage drop corresponding to the green LED module; generating a third set of CIE tristimulus values corresponding to the green LED module based on the third feedback voltage, the first feedback voltage, the second feedback voltage, the first set of CIE tristimulus values, and the second set of CIE tristimulus values corresponding to the green LED module; generating a third feedback voltage corresponding to the blue LED module based on a third voltage drop corresponding to the blue LED module; generating a third set of CIE tristimulus values corresponding to the blue LED module based on the third feedback voltage, the first feedback voltage, the second feedback voltage, the first set of CIE tristimulus values, and the second set of CIE tristimulus values corresponding to the blue LED module; calculating a first duty cycle control signal, a second duty cycle control signal, and a third duty cycle control signal based on the third set of CIE tristimulus values corresponding to the red LED module, the third set of CIE tristimulus values corresponding to the green LED module, the third set of CIE tristimulus values corresponding to the blue LED module, and a set of preset CIE tristimulus values; and regulating the first driving current based on the first duty cycle control signal, regulating the second driving current based on the second duty cycle control signal, and regulating the third driving current based on the third duty cycle control signal; wherein the first interval, the second interval, and the third interval are not overlapped between each other.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto. Furthermore, the step serial numbers concerning the color control method are not meant thereto limit the operating sequence, and any rearrangement of the operating sequence for achieving same functionality is still within the spirit and scope of the invention.

Figure 1:
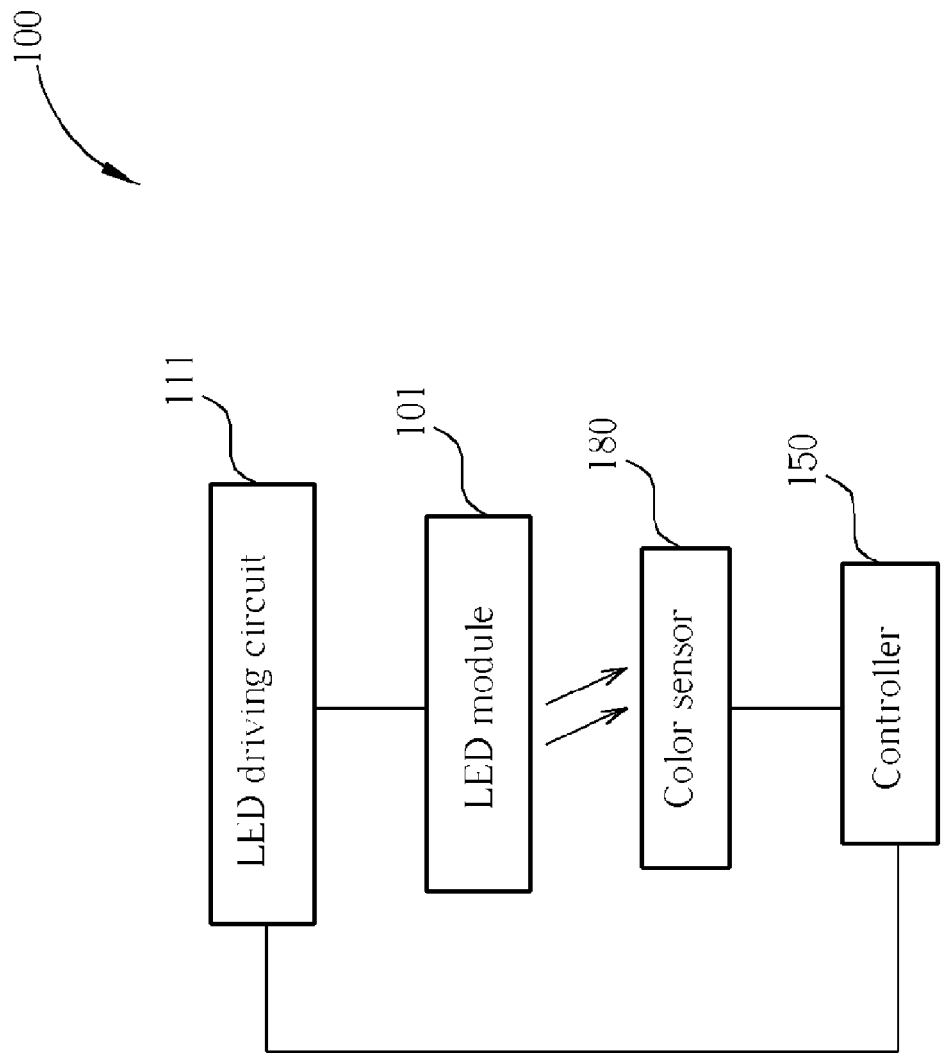
FIG. 1 is a functional block diagram schematically showing a prior-art LED lighting system.
Figure 2:
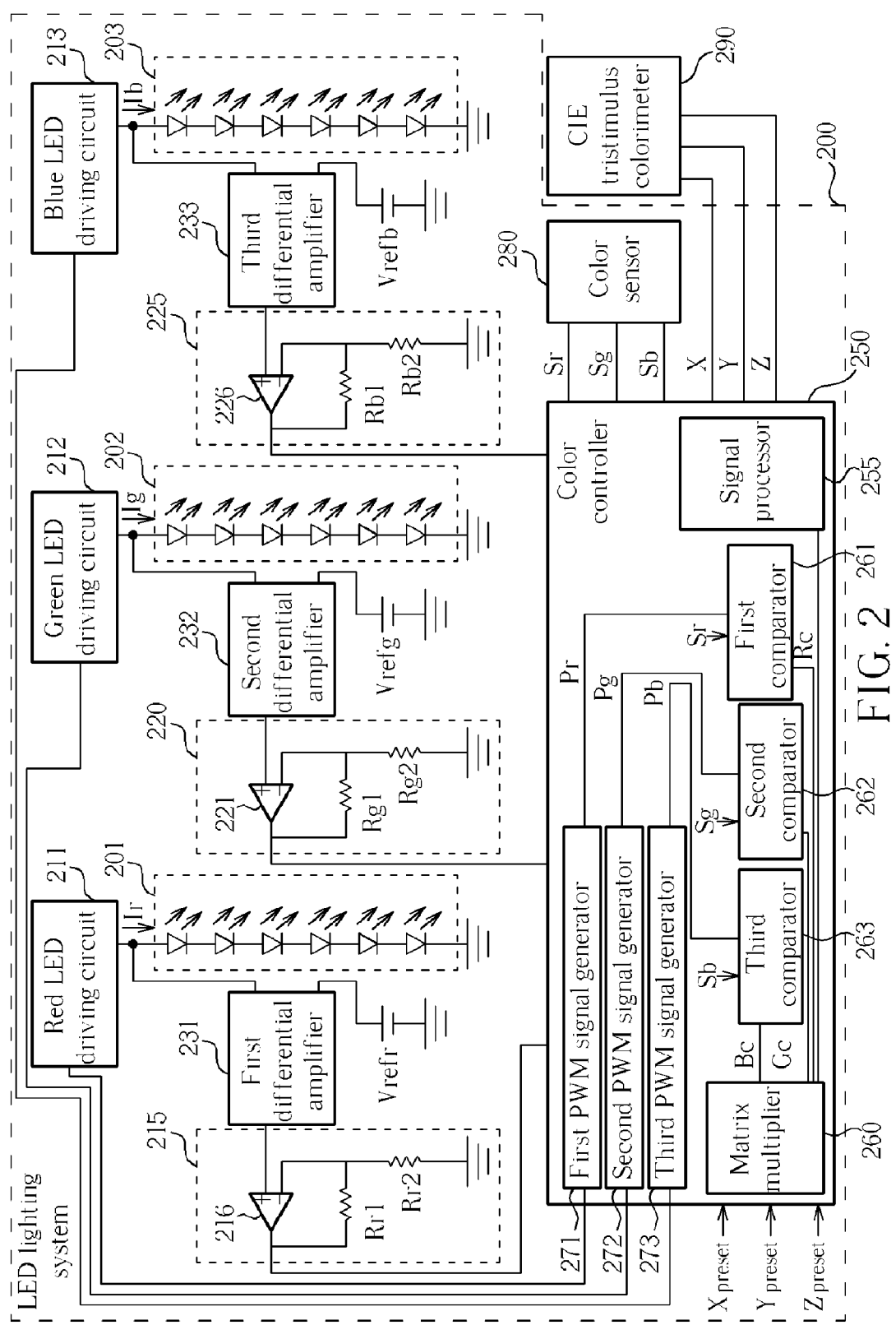
FIG. 2 is a functional block diagram schematically showing an LED lighting system having color control mechanism in accordance with a first embodiment of the present invention.

FIG. 2 is a functional block diagram schematically showing an LED lighting system 200 having color control mechanism in accordance with a first embodiment of the present invention. The LED lighting system 200 comprises a red LED module 201, a green LED module 202, a blue LED module 203, a red LED driving circuit 211, a green LED driving circuit 212, a blue LED driving circuit 213, a first signal amplifier 215, a second signal amplifier 220, a third signal amplifier 225, a first differential amplifier 231, a second differential amplifier 232, a third differential amplifier 233, a color controller 250, and a color sensor 280.

Each of the red LED module 201, the green LED module 202, and the blue LED module 203 comprises at least a column of LEDs. Each column of LEDs comprises at least an LED or a plurality of series-connected LEDs. The color controller 250 can be coupled to a CIE tristimulus colorimeter 290. The CIE tristimulus colorimeter 290 is utilized to detect the light generated by the red LED module 201, the green LED module 202, or the blue LED module 203 for generating a set of CIE tristimulus values X, Y, and Z. The set of CIE tristimulus values X, Y, and Z is forwarded to the color controller 250.

The red LED driving circuit 211 functions as a current driving circuit and is coupled to the red LED module 201 for providing a first driving current Ir. The green LED driving circuit 212 functions as a current driving circuit and is coupled to the green LED module 202 for providing a second driving current Ig. The blue LED driving circuit 213 functions as a current driving circuit and is coupled to the blue LED module 203 for providing a third driving current Ib.

The first differential amplifier 231 is coupled to the red LED module 201 for generating a first differential voltage by performing a differential amplifying operation on a first reference voltage Vrefr and a first voltage drop corresponding to the red LED module 201. The first signal amplifier 215 is coupled to the first differential amplifier 231 for generating a first feedback voltage by performing a signal amplifying operation on the first differential voltage.

The second differential amplifier 232 is coupled to the green LED module 202 for generating a second differential voltage by performing a differential amplifying operation on a second reference voltage Vrefg and a second voltage drop corresponding to the green LED module 202. The second signal amplifier 220 is coupled to the second differential amplifier 232 for generating a second feedback voltage by performing a signal amplifying operation on the second differential voltage.

The third differential amplifier 233 is coupled to the blue LED module 203 for generating a third differential voltage by performing a differential amplifying operation on a third reference voltage Vrefb and a third voltage drop corresponding to the blue LED module 203. The third signal amplifier 225 is coupled to the third differential amplifier 233 for generating a third feedback voltage by performing a signal amplifying operation on the third differential voltage.

The first signal amplifier 215 can be a non-inverting amplifying circuit comprising an operational amplifier 216, a resistor Rr1, and a resistor Rr2. The second signal amplifier 220 can be a non-inverting amplifying circuit comprising an operational amplifier 221, a resistor Rg1, and a resistor Rg2. The third signal amplifier 225 can be a non-inverting amplifying circuit comprising an operational amplifier 226, a resistor Rb1, and a resistor Rb2.

In one embodiment, the first signal amplifier 215, the second signal amplifier 220, and the third signal amplifier 225 can be omitted. That is, the first, second, and third differential voltages can be forwarded directly to the color controller 250 and function as the first, second, and third feedback voltages respectively. In another embodiment, the first differential amplifier 231, the second differential amplifier 232, and the third differential amplifier 233 can be omitted. That is, the first signal amplifier 215, the second signal amplifier 220, and the third signal amplifier 225 can be coupled directly to the red LED module 201, the green LED module 202, and the blue LED module 203 respectively, and the first, second, and third feedback voltages can be generated by performing signal amplifying operations directly on the first, second, and third voltage drops respectively.

The color sensor 280 is coupled to the color controller 250 for generating at least a red light signal Sr, at least a green light signal Sg, and at least a blue light signal Sb through detecting the light generated by the red LED module 210, the green LED module 202, or the blue LED module 203. The red light signal Sr, the green light signal Sg, and the blue light signal Sb are forwarded to the color controller 250. The color controller 250 comprises a signal processor 255, a matrix multiplier 260, a first comparator 261, a second comparator 262, a third comparator 263, a first pulse-width-modulation (PWM) signal generator 271, a second pulse-width-modulation signal generator 272, and a third pulse-width-modulation signal generator 273.

The signal processor 255 is utilized to generate a coefficient matrix based on the first feedback voltage, the second feedback voltage, the third feedback voltage, the red light signal Sr, the green light signal Sg, the blue light signal Sb, and the set of CIE tristimulus values X, Y, and Z. The matrix multiplier 260 is coupled to the signal processor 255 for generating a first control signal Rc, a second control signal Gc, and a third control signal Bc based on the coefficient matrix and a set of preset CIE tristimulus values Xpreset, Ypreset, and Zpreset. In another embodiment, the matrix multiplier 260 can be incorporated in the signal processor 255. That is, the first control signal Rc, the second control signal Gc, and the third control signal Bc can be generated directly by the signal processor 255.

The first comparator 261 is coupled to the matrix multiplier 260 for generating a first duty cycle control signal Pr by comparing the first control signal Rc with a corresponding red light signal Sr. The second comparator 262 is coupled to the matrix multiplier 260 for generating a second duty cycle control signal Pg by comparing the second control signal Gc with a corresponding green light signal Sg. The third comparator 263 is coupled to the matrix multiplier 260 for generating a third duty cycle control signal Pb by comparing the third control signal Bc with a corresponding blue light signal Sb.

The first PWM signal generator 271 is coupled between the first comparator 261 and the red LED driving circuit 211 for regulating the duty cycle of a first PWM signal based on the first duty cycle control signal Pr. The first PWM signal is forwarded to the red LED driving circuit 211 for adjusting the first driving current Ir. The second PWM signal generator 272 is coupled between the second comparator 262 and the green LED driving circuit 212 for regulating the duty cycle of a second PWM signal based on the second duty cycle control signal Pg. The second PWM signal is forwarded to the green LED driving circuit 212 for adjusting the second driving current Ig. The third PWM signal generator 273 is coupled between the third comparator 263 and the blue LED driving circuit 213 for regulating the duty cycle of a third PWM signal based on the third duty cycle control signal Pb. The third PWM signal is forwarded to the blue LED driving circuit 213 for adjusting the third driving current Ib.

In the operation of the LED lighting system 200, as the wavelength shift of the light emitted from the red LED module 201, the green LED module 202, or the blue LED module 203 occurs due to temperature variation, the first, second, or third feedback voltage is changed accordingly. For that reason, the light generated by the red LED module 201, the green LED module 202, or the blue LED module 203 can be controlled precisely based on the first, second, or third feedback voltage. A corresponding color control method based on the LED lighting system 200 will be detailed below.

Figure 3:
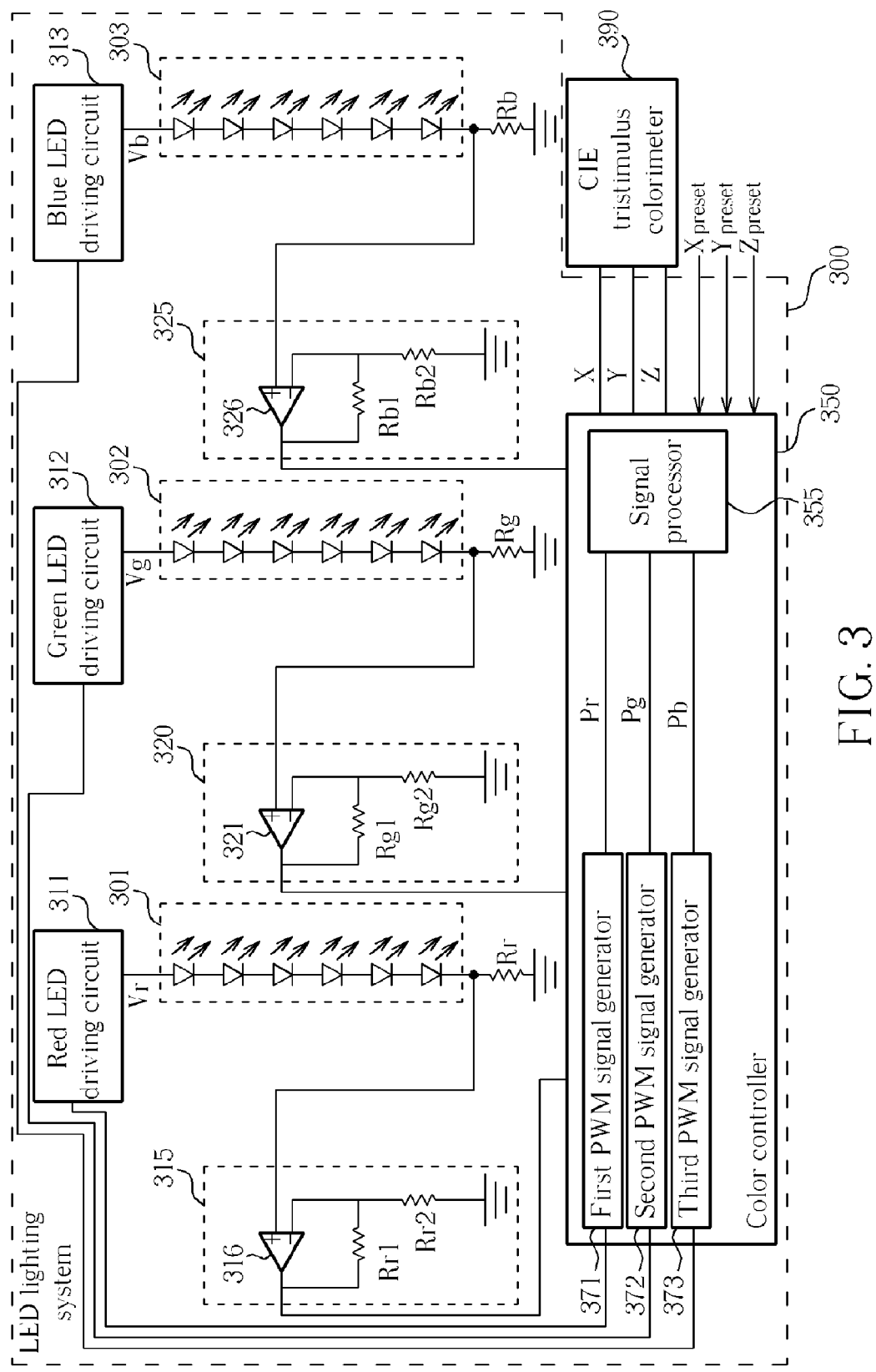
FIG. 3 is a functional block diagram schematically showing an LED lighting system having color control mechanism in accordance with a second embodiment of the present invention.

FIG. 3 is a functional block diagram schematically showing an LED lighting system 300 having color control mechanism in accordance with a second embodiment of the present invention. The LED lighting system 300 comprises a red LED module 301, a green LED module 302, a blue LED module 303, a first resistor Rr, a second resistor Rg, a third resistor Rb, a red LED driving circuit 311, a green LED driving circuit 312, a blue LED driving circuit 313, a first signal amplifier 315, a second signal amplifier 320, a third signal amplifier 325, and a color controller 350.

Each of the red LED module 301, the green LED module 302, and the blue LED module 303 comprises at least a column of LEDs. Each column of LEDs comprises at least an LED or a plurality of series-connected LEDs. The color controller 350 can be coupled to a CIE tristimulus colorimeter 390. The CIE tristimulus colorimeter 390 is utilized to detect the light generated by the red LED module 301, the green LED module 302, or the blue LED module 303 for generating a set of CIE tristimulus values X, Y, and Z. The set of CIE tristimulus values X, Y, and Z is forwarded to the color controller 350.

The red LED driving circuit 311 functions as a voltage driving circuit and is coupled to the red LED module 301 for providing a first driving voltage Vr. The green LED driving circuit 312 functions as a voltage driving circuit and is coupled to the green LED module 302 for providing a second driving voltage Vg. The blue LED driving circuit 313 functions as a voltage driving circuit and is coupled to the blue LED module 303 for providing a third driving voltage Vb. The first resistor Rr is coupled to the red LED module 301 for generating a first voltage drop proportional to the current flowing through the red LED module 301. The second resistor Rg is coupled to the green LED module 302 for generating a second voltage drop proportional to the current flowing through the green LED module 302. The third resistor Rb is coupled to the blue LED module 303 for generating a third voltage drop proportional to the current flowing through the blue LED module 303.

The first signal amplifier 315 is coupled to the first resistor Rr and the red LED module 301 for generating a first feedback voltage by performing a signal amplifying operation on the first voltage drop. The first signal amplifier 315 can be a non-inverting amplifying circuit comprising an operational amplifier 316, a resistor Rr1, and a resistor Rr2. The second signal amplifier 320 is coupled to the second resistor Rg and the green LED module 302 for generating a second feedback voltage by performing a signal amplifying operation on the second voltage drop. The second signal amplifier 320 can be a non-inverting amplifying circuit comprising an operational amplifier 321, a resistor Rg1, and a resistor Rg2. The third signal amplifier 325 is coupled to the third resistor Rb and the blue LED module 303 for generating a third feedback voltage by performing a signal amplifying operation on the third voltage drop. The third signal amplifier 325 can be a non-inverting amplifying circuit comprising an operational amplifier 326, a resistor Rb1, and a resistor Rb2.

The color controller 350 comprises a signal processor 355, a first PWM signal generator 371, a second PWM signal generator 372, and a third PWM signal generator 373. The signal processor 355 is utilized to generate a first duty cycle control signal Pr, a second duty cycle control signal Pg, and a third duty cycle control signal Pb based on the first feedback voltage, the second feedback voltage, the third feedback voltage, the set of CIE tristimulus values X, Y, and Z, and a set of preset CIE tristimulus values Xpreset, Ypreset, and Zpreset.

The first PWM signal generator 371 is coupled between the signal processor 355 and the red LED driving circuit 311 for regulating the duty cycle of a first PWM signal based on the first duty cycle control signal Pr. The first PWM signal is forwarded to the red LED driving circuit 311 for adjusting the first driving voltage Vr. The second PWM signal generator 372 is coupled between the signal processor 355 and the green LED driving circuit 312 for regulating the duty cycle of a second PWM signal based on the second duty cycle control signal Pg. The second PWM signal is forwarded to the green LED driving circuit 312 for adjusting the second driving voltage Vg. The third PWM signal generator 373 is coupled between the signal processor 355 and the blue LED driving circuit 313 for regulating the duty cycle of a third PWM signal based on the third duty cycle control signal Pb. The third PWM signal is forwarded to the blue LED driving circuit 313 for adjusting the third driving Voltage Vb.

In the operation of the LED lighting system 300, as the wavelength shift of the light emitted from the red LED module 301, the green LED module 302, or the blue LED module 303 occurs due to temperature variation, the first, second, or third feedback voltage is changed accordingly. For that reason, the light generated by the red LED module 301, the green LED module 302, or the blue LED module 303 can be controlled precisely based on the first, second, or third feedback voltage. A corresponding color control method based on the LED lighting system 300 will be detailed below.

Figure 4:
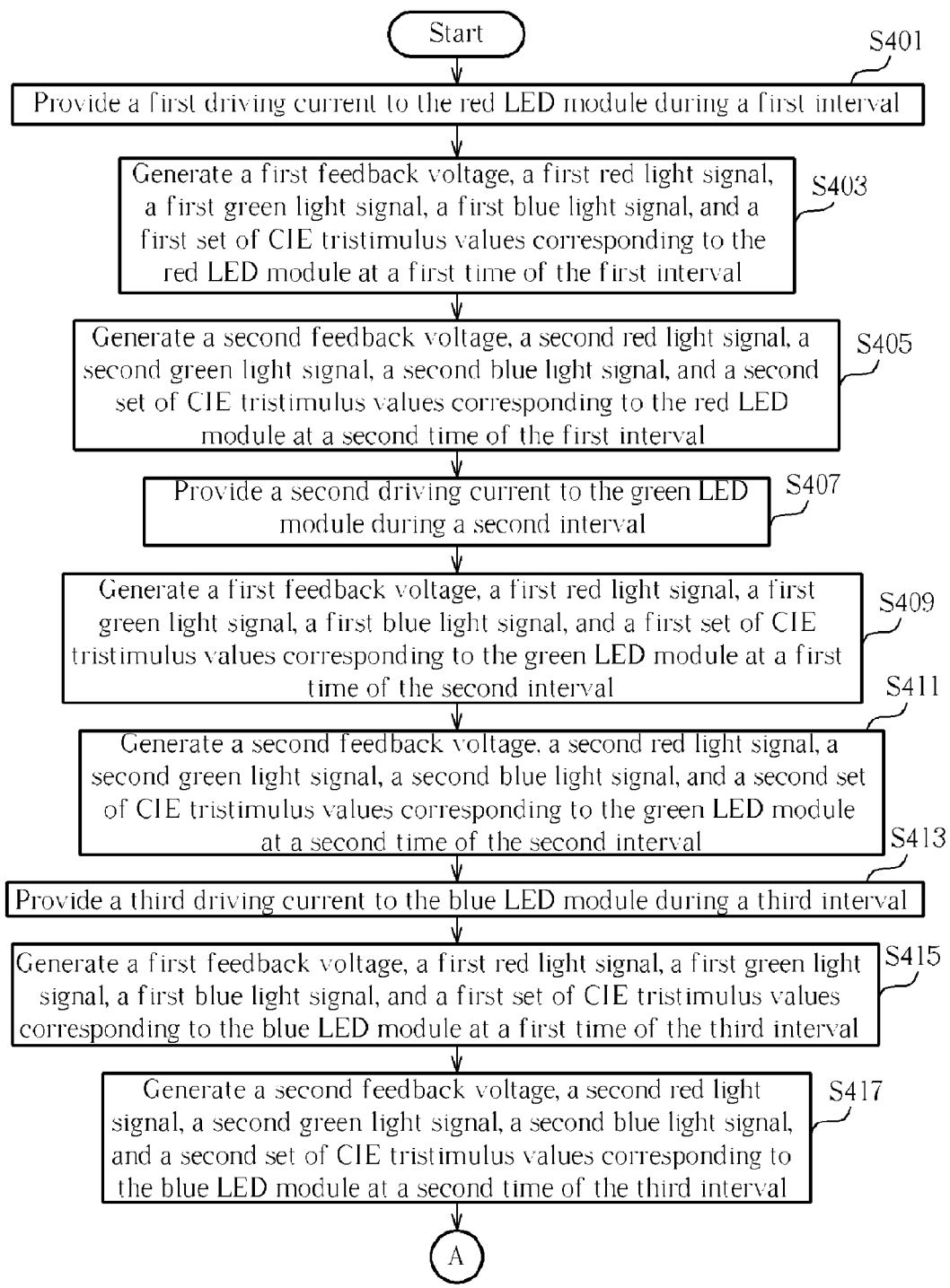
FIGS. 4, 5, and 6 present a flowchart depicting a color control method based on the LED lighting system shown in FIG. 2.
Figure 5:
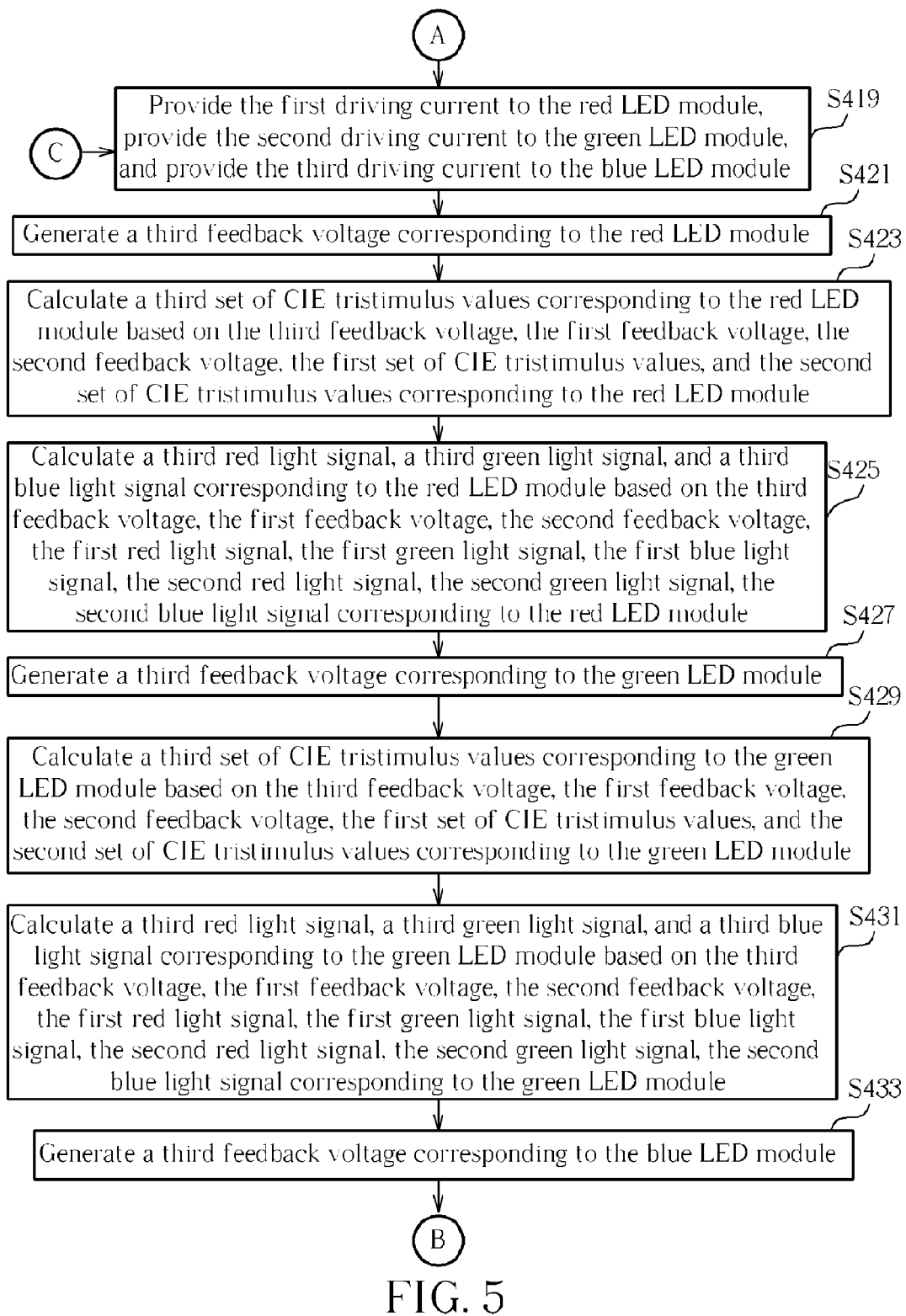
Figure 6:
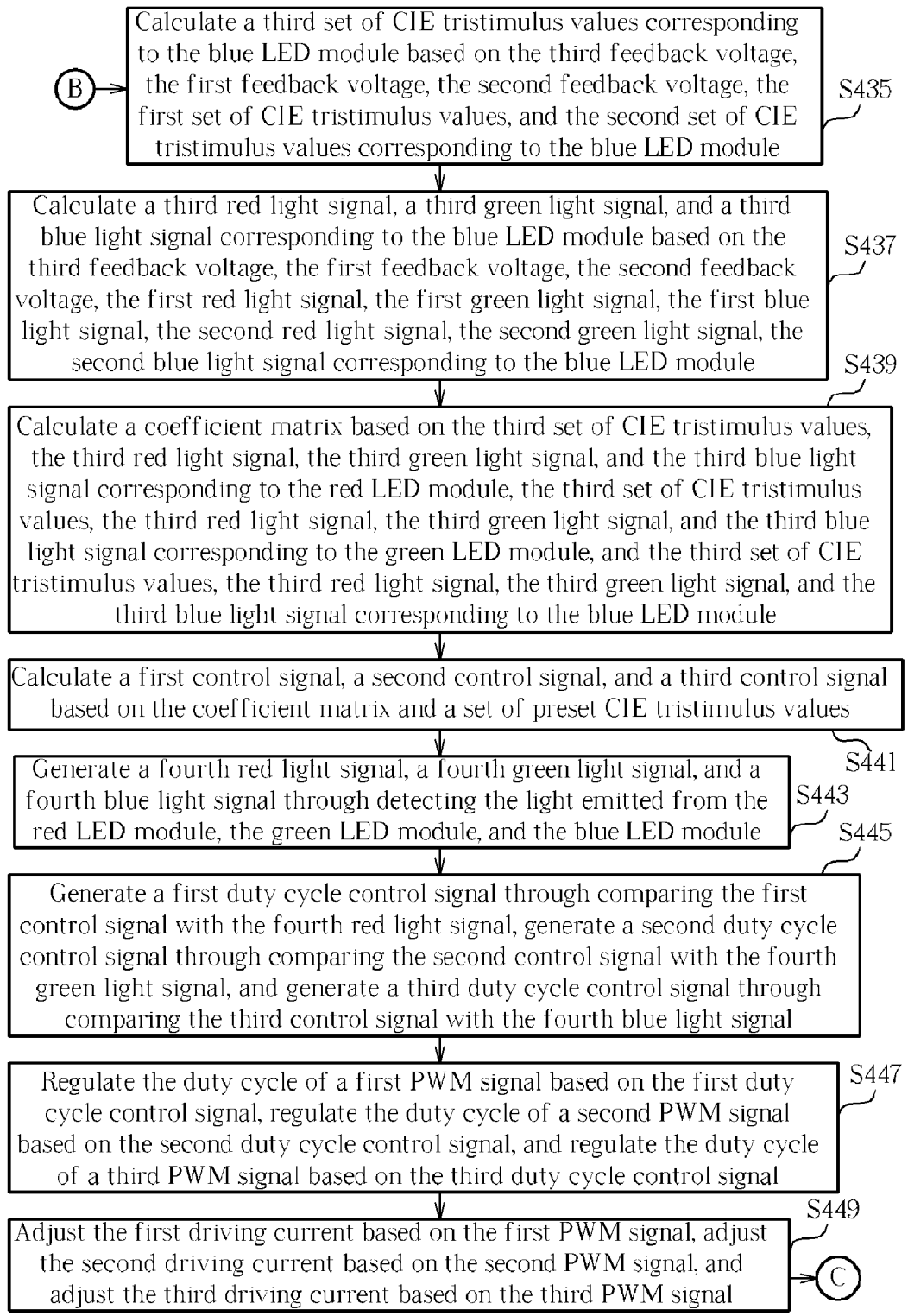

FIGS. 4, 5, and 6 present a flowchart depicting a color control method based on the LED lighting system 200 shown in FIG. 2. The color control method comprises:

Step S401: provide a first driving current Ir to the red LED module 201 by the red LED driving circuit 211 during a first interval;

Step S403: generate a first feedback voltage V1a corresponding to the red LED module 201 through performing differential amplifying and signal amplifying operations on a first voltage drop corresponding to the red LED module 201 by the first differential amplifier 231 and the first signal amplifier 215, and generate a first red light signal R1a, a first green light signal G1a, a first blue light signal B1a, and a first set of CIE tristimulus values X1a, Y1a, and Z1a corresponding to the red LED module 201 through detecting the light emitted from the red LED module 201 by the color sensor 280 and the CIE tristimulus colorimeter 290 at a first time of the first interval;

Step S405: generate a second feedback voltage V1b corresponding to the red LED module 201 through performing differential amplifying and signal amplifying operations on a second voltage drop corresponding to the red LED module 201 by the first differential amplifier 231 and the first signal amplifier 215, and generate a second red light signal R1b, a second green light signal G1b, a second blue light signal B1b, and a second set of CIE tristimulus values X1b, Y1b, and Z1b corresponding to the red LED module 201 through detecting the light emitted from the red LED module 201 by the color sensor 280 and the CIE tristimulus colorimeter 290 at a second time of the first interval;

Step S407: provide a second driving current Ig to the green LED module 202 by the green LED driving circuit 212 during a second interval;

Step S409: generate a first feedback voltage V2a corresponding to the green LED module 202 through performing differential amplifying and signal amplifying operations on a first voltage drop corresponding to the green LED module 202 by the second differential amplifier 232 and the second signal amplifier 220, and generate a first red light signal R2a, a first green light signal G2a, a first blue light signal B1a, and a first set of CIE tristimulus values X2a, Y2a, and Z2a corresponding to the green LED module 202 through detecting the light emitted from the green LED module 202 by the color sensor 280 and the CIE tristimulus colorimeter 290 at a first time of the second interval;

Step S411: generate a second feedback voltage V2b corresponding to the green LED module 202 through performing differential amplifying and signal amplifying operations on a second voltage drop corresponding to the green LED module 202 by the second differential amplifier 232 and the second signal amplifier 220, and generate a second red light signal R2b, a second green light signal G2b, a second blue light signal B1b, and a second set of CIE tristimulus values X2b, Y2b, and Z2b corresponding to the green LED module 202 through detecting the light emitted from the green LED module 202 by the color sensor 280 and the CIE tristimulus colorimeter 290 at a second time of the second interval;

Step S413: provide a third driving current Ib to the blue LED module 203 by the blue LED driving circuit 213 during a third interval;

Step S415: generate a first feedback voltage V3a corresponding to the blue LED module 203 through performing differential amplifying and signal amplifying operations on a first voltage drop corresponding to the blue LED module 203 by the third differential amplifier 233 and the third signal amplifier 225, and generate a first red light signal R3*a*, a first green light signal G3*a*, a first blue light signal B3*a*, and a first set of CIE tristimulus values X3*a*, Y3*a*, and Z3*a* corresponding to the blue LED module 203 through detecting the light emitted from the blue LED module 203 by the color sensor 280 and the CIE tristimulus colorimeter 290 at a first time of the third interval;

Step S417: generate a second feedback voltage V3*b* corresponding to the blue LED module 203 through performing differential amplifying and signal amplifying operations on a second voltage drop corresponding to the blue LED module 203 by the third differential amplifier 233 and the third signal amplifier 225, and generate a second red light signal R3*b*, a second green light signal G3*b*, a second blue light signal B3*b*, and a second set of CIE tristimulus values X3*b*, Y3*b*, and Z3*b* corresponding to the blue LED module 203 through detecting the light emitted from the blue LED module 203 by the color sensor 280 and the CIE tristimulus colorimeter 290 at a second time of the third interval;

Step S419: provide the first driving current Ir to the red LED module 201 by the red LED driving circuit 211, provide the second driving current Ig to the green LED module 202 by the green LED driving circuit 212, and provide the third driving current Ib to the blue LED module 203 by the blue LED driving circuit 213;

Step S421: generate a third feedback voltage V1*t* corresponding to the red LED module 201 through performing differential amplifying and signal amplifying operations on a third voltage drop corresponding to the red LED module 201 by the first differential amplifier 231 and the first signal amplifier 215;

Step S423: calculate a third set of CIE tristimulus values X1*t*, Y1*t*, and Z1*t* corresponding to the red LED module 201 based on the third feedback voltage V1*t*, the first feedback voltage V1*a*, the second feedback voltage V1*b*, the first set of CIE tristimulus values X1*a*, Y1*a*, and Z1*a*, and the second set of CIE tristimulus values X1*b*, Y1*b*, and Z1*b* corresponding to the red LED module 201 by the signal processor 255 according to the formulas (1), (2), and (3) listed below:

$$\frac{V1a-V1b}{X1a-X1b} = \frac{V1a-V1t}{X1a-X1t}, \quad \text{Formula (1)}$$

$$\frac{V1a-V1b}{Y1a-Y1b} = \frac{V1a-V1t}{Y1a-Y1t}, \quad \text{Formula (2)}$$

and $$\frac{V1a-V1b}{Z1a-Z1b} = \frac{V1a-V1t}{Z1a-Z1t}; \quad \text{Formula (3)}$$

Step S425: calculate a third red light signal R1*t*, a third green light signal G1*t*, and a third blue light signal B1*t* corresponding to the red LED module 201 based on the third feedback voltage V1*t*, the first feedback voltage V1*a*, the second feedback voltage V1*b*, the first red light signal R1*a*, the first green light signal G1*a*, the first blue light signal B1*a*, the second red light signal R1*b*, the second green light signal G1*b*, the second blue light signal B1*b* corresponding to the red LED module 201 by the signal processor 255 according to the formulas (4), (5), and (6) listed below:

$$\frac{V1a-V1b}{R1a-R1b} = \frac{V1a-V1t}{R1a-R1t}, \quad \text{Formula (4)}$$

-continued $$\frac{V1a-V1b}{G1a-G1b} = \frac{V1a-V1t}{G1a-G1t}, \quad \text{Formula (5)}$$

and $$\frac{V1a-V1b}{B1a-B1b} = \frac{V1a-V1t}{B1a-B1t}; \quad \text{Formula (6)}$$

Step S427: generate a third feedback voltage V2*t* corresponding to the green LED module 202 through performing differential amplifying and signal amplifying operations on a third voltage drop corresponding to the green LED module 202 by the second differential amplifier 232 and the second signal amplifier 220;

Step S429: calculate a third set of CIE tristimulus values X2*t*, Y2*t*, and Z2*t* corresponding to the green LED module 202 based on the third feedback voltage V2*t*, the first feedback voltage V2*a*, the second feedback voltage V2*b*, the first set of CIE tristimulus values X2*a*, Y2*a*, and Z2*a*, and the second set of CIE tristimulus values X2*b*, Y2*b*, and Z2*b* corresponding to the green LED module 202 by the signal processor 255 according to the formulas (7), (8), and (9) listed below:

$$\frac{V2a-V2b}{X2a-X2b} = \frac{V2a-V2t}{X2a-X2t}, \quad \text{Formula (7)}$$

$$\frac{V2a-V2b}{Y2a-Y2b} = \frac{V2a-V2t}{Y2a-Y2t}, \quad \text{Formula (8)}$$

and $$\frac{V2a-V2b}{Z2a-Z2b} = \frac{V2a-V2t}{Z2a-Z2t}; \quad \text{Formula (9)}$$

Step S431: calculate a third red light signal R2*t*, a third green light signal G2*t*, and a third blue light signal B2*t* corresponding to the green LED module 202 based on the third feedback voltage V2*t*, the first feedback voltage V2*a*, the second feedback voltage V2*b*, the first red light signal R2*a*, the first green light signal G2*a*, the first blue light signal B2*a*, the second red light signal R2*b*, the second green light signal G2*b*, the second blue light signal B2*b* corresponding to the green LED module 202 by the signal processor 255 according to the formulas (10), (11), and (12) listed below:

$$\frac{V2a-V2b}{R2a-R2b} = \frac{V2a-V2t}{R2a-R2t}, \quad \text{Formula (10)}$$

$$\frac{V2a-V2b}{G2a-G2b} = \frac{V2a-V2t}{G2a-G2t}, \quad \text{Formula (11)}$$

and $$\frac{V2a-V2b}{B2a-B2b} = \frac{V2a-V2t}{B2a-B2t}; \quad \text{Formula (12)}$$

Step S433: generate a third feedback voltage V3*t* corresponding to the blue LED module 203 through performing differential amplifying and signal amplifying operations on a third voltage drop corresponding to the blue LED module 203 by the third differential amplifier 233 and the third signal amplifier 225;

Step S435: calculate a third set of CIE tristimulus values X3*t*, Y3*t*, and Z3*t* corresponding to the blue LED module 203 based on the third feedback voltage V3*t*, the first feedback voltage V3a, the second feedback voltage V3b, the first set of CIE tristimulus values X3a, Y3a, and Z3a, and the second set of CIE tristimulus values X3b, Y3b, and Z3b corresponding to the blue LED module 203 by the signal processor 255 according to the formulas (13), (14), and (15) listed below:

$$\frac{V3a - V3b}{X3a - X3b} = \frac{V3a - V3t}{X3a - X3t}, \quad \text{Formula (13)}$$

$$\frac{V3a - V3b}{Y3a - Y3b} = \frac{V3a - V3t}{Y3a - Y3t}, \quad \text{Formula (14)}$$

and $$\frac{V3a - V3b}{Z3a - Z3b} = \frac{V3a - V3t}{Z3a - Z3t}; \quad \text{Formula (15)}$$

Step S437: calculate a third red light signal R3t, a third green light signal G3t, and a third blue light signal B3t corresponding to the blue LED module 203 based on the third feedback voltage V3t, the first feedback voltage V3a, the second feedback voltage V3b, the first red light signal R3a, the first green light signal G3a, the first blue light signal B3a, the second red light signal R3b, the second green light signal G3b, the second blue light signal B3b corresponding to the blue LED module 203 by the signal processor 255 according to the formulas (16), (17), and (18) listed below:

$$\frac{V3a - V3b}{R3a - R3b} = \frac{V3a - V3t}{R3a - R3t}, \quad \text{Formula (16)}$$

$$\frac{V3a - V3b}{G3a - G3b} = \frac{V3a - V3t}{G3a - G3t}, \quad \text{Formula (17)}$$

and $$\frac{V3a - V3b}{B3a - B3b} = \frac{V3a - V3t}{B3a - B3t}; \quad \text{Formula (18)}$$

Step S439: calculate a coefficient matrix $[Dij]_{3\times3}$ based on the third set of CIE tristimulus values X1t, Y1t, and Z1t, the third red light signal R1t, the third green light signal G1t, and the third blue light signal B1t corresponding to the red LED module 201, the third set of CIE tristimulus values X2t, Y2t, and Z2t, the third red light signal R2t, the third green light signal G2t, and the third blue light signal B2t corresponding to the green LED module 202, and the third set of CIE tristimulus values X3t, Y3t, and Z3t, the third red light signal R3t, the third green light signal G3t, and the third blue light signal B3t corresponding to the blue LED module 203 through matrix inverting and matrix multiplying operations performed by the signal processor 255 according to the formula (19) listed below:

$$\begin{bmatrix} R1t & R2t & R3t \\ G1t & G2t & G3t \\ B1t & B2t & B3t \end{bmatrix} = \begin{bmatrix} D11 & D12 & D13 \\ D21 & D22 & D23 \\ D31 & D32 & D33 \end{bmatrix} \times \begin{bmatrix} X1t & X2t & X3t \\ Y1t & Y2t & Y3t \\ Z1t & Z2t & Z3t \end{bmatrix}, \quad \text{Formula (19)}$$

wherein the coefficient matrix $[Dij]_{3\times3}$ is the matrix comprising coefficients D11 through D33 in the formula (19);

Step S441: calculate a first control signal Rc, a second control signal Gc, and a third control signal Bc based on the coefficient matrix $[Dij]_{3\times3}$ and a set of preset CIE tristimulus values Xpreset, Ypreset, and Zpreset through a matrix multiplying operation performed by the matrix multiplier 260 according to the formula (20) listed below:

$$\begin{bmatrix} Rc \\ Gc \\ Bc \end{bmatrix} = \begin{bmatrix} D11 & D12 & D13 \\ D21 & D22 & D23 \\ D31 & D32 & D33 \end{bmatrix} \times \begin{bmatrix} Xpreset \\ Ypreset \\ Zpreset \end{bmatrix}, \quad \text{Formula (20)}$$

Step S443: generate a fourth red light signal, a fourth green light signal, and a fourth blue light signal through detecting the light emitted from the red LED module 201, the green LED module 202, and the blue LED module 203 by the color sensor 280;

Step S445: generate a first duty cycle control signal Pr through comparing the first control signal Rc with the fourth red light signal by the first comparator 261, generate a second duty cycle control signal Pg through comparing the second control signal Gc with the fourth green light signal by the second comparator 262, and generate a third duty cycle control signal Pb through comparing the third control signal Bc with the fourth blue light signal by the third comparator 263;

Step S447: regulate the duty cycle of a first PWM signal based on the first duty cycle control signal Pr by the first PWM signal generator 271, regulate the duty cycle of a second PWM signal based on the second duty cycle control signal Pg by the second PWM signal generator 272, and regulate the duty cycle of a third PWM signal based on the third duty cycle control signal Pb by the third PWM signal generator 273; and Step S449: adjust the first driving current Ir based on the first PWM signal by the red LED driving circuit 211, adjust the second driving current Ig based on the second PWM signal by the green LED driving circuit 212, and adjust the third driving current Ib based on the third PWM signal by the blue LED driving circuit 213, go back to step S419.

The color control method based on the LED lighting system 200 comprises a preliminary detection phase and a feedback control phase. The preliminary detection phase including the steps from S401 to S417 is utilized to detect the voltage drop of each LED module and the corresponding color signals and CIE tristimulus values. The first interval, the second interval, and the third interval are not overlapped between each other. The feedback control phase including the steps from S419 to S449 is utilized to precisely control the light emitted form each LED module through regulating the driving current for each LED module by performing compensation operations based on the voltage drop variations in conjunction with the color signals and the CIE tristimulus values generated in the preliminary detection phase.

In the steps S403, S405, and S421, the processes of performing differential amplifying and signal amplifying operations on the first, second, and third voltage drops corresponding to the red LED module 201 by the first differential amplifier 231 and the first signal amplifier 215 can be simplified to be the processes of performing differential amplifying operations on the first, second, and third voltage drops corresponding to the red LED module 201 in conjunction with the first reference voltage Vrefr by the first differential amplifier 231, or alternatively, the processes of performing signal amplifying operations on the first, second, and third voltage drops corresponding to the red LED module 201 by the first signal amplifier 215.

Similarly, in the steps S409, S411, and S427, the processes of performing differential amplifying and signal amplifying operations on the first, second, and third voltage drops corresponding to the green LED module 202 by the second differential amplifier 232 and the second signal amplifier 220 can be simplified to be the processes of performing differential amplifying operations on the first, second, and third voltage drops corresponding to the green LED module 202 in conjunction with the second reference voltage Vrefg by the second differential amplifier 232, or alternatively, the processes of performing signal amplifying operations on the first, second, and third voltage drops corresponding to the green LED module 202 by the second signal amplifier 220.

Likewise, in the steps S415, S417, and S433, the processes of performing differential amplifying and signal amplifying operations on the first, second, and third voltage drops corresponding to the blue LED module 203 by the third differential amplifier 233 and the third signal amplifier 225 can be simplified to be the processes of performing differential amplifying operations on the first, second, and third voltage drops corresponding to the blue LED module 203 in conjunction with the third reference voltage Vrefb by the third differential amplifier 233, or alternatively, the processes of performing signal amplifying operations on the first, second, and third voltage drops corresponding to the blue LED module 203 by the third signal amplifier 225.

Since the CIE tristimulus calorimeter 290 is used only in the preliminary detection phase, the CIE tristimulus calorimeter 290 can be detached from the LED lighting system 200 at the completion of the step S417.

Figure 7:
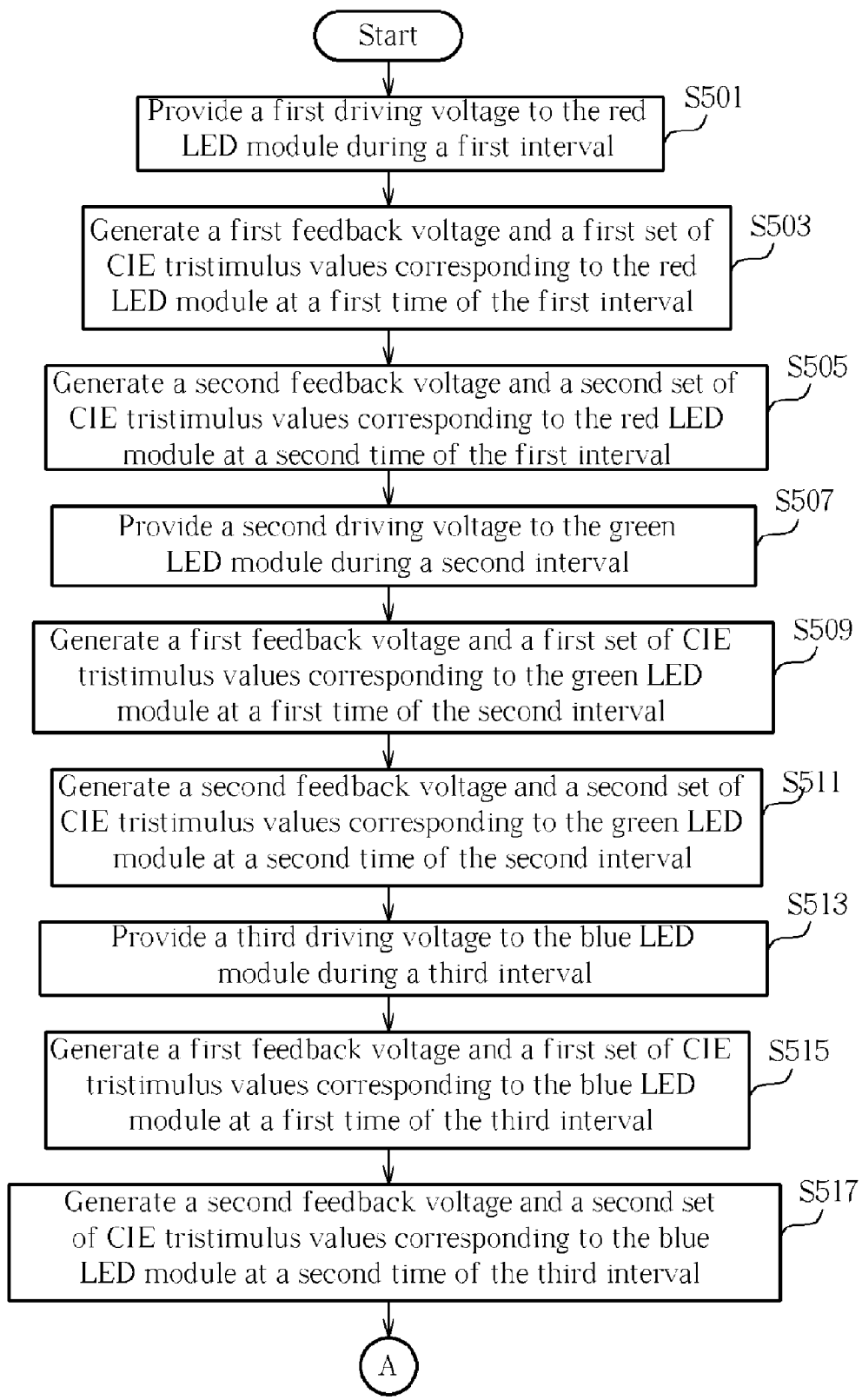
FIGS. 7 and 8 present a flowchart depicting a color control method based on the LED lighting system shown in FIG. 3.
Figure 8:
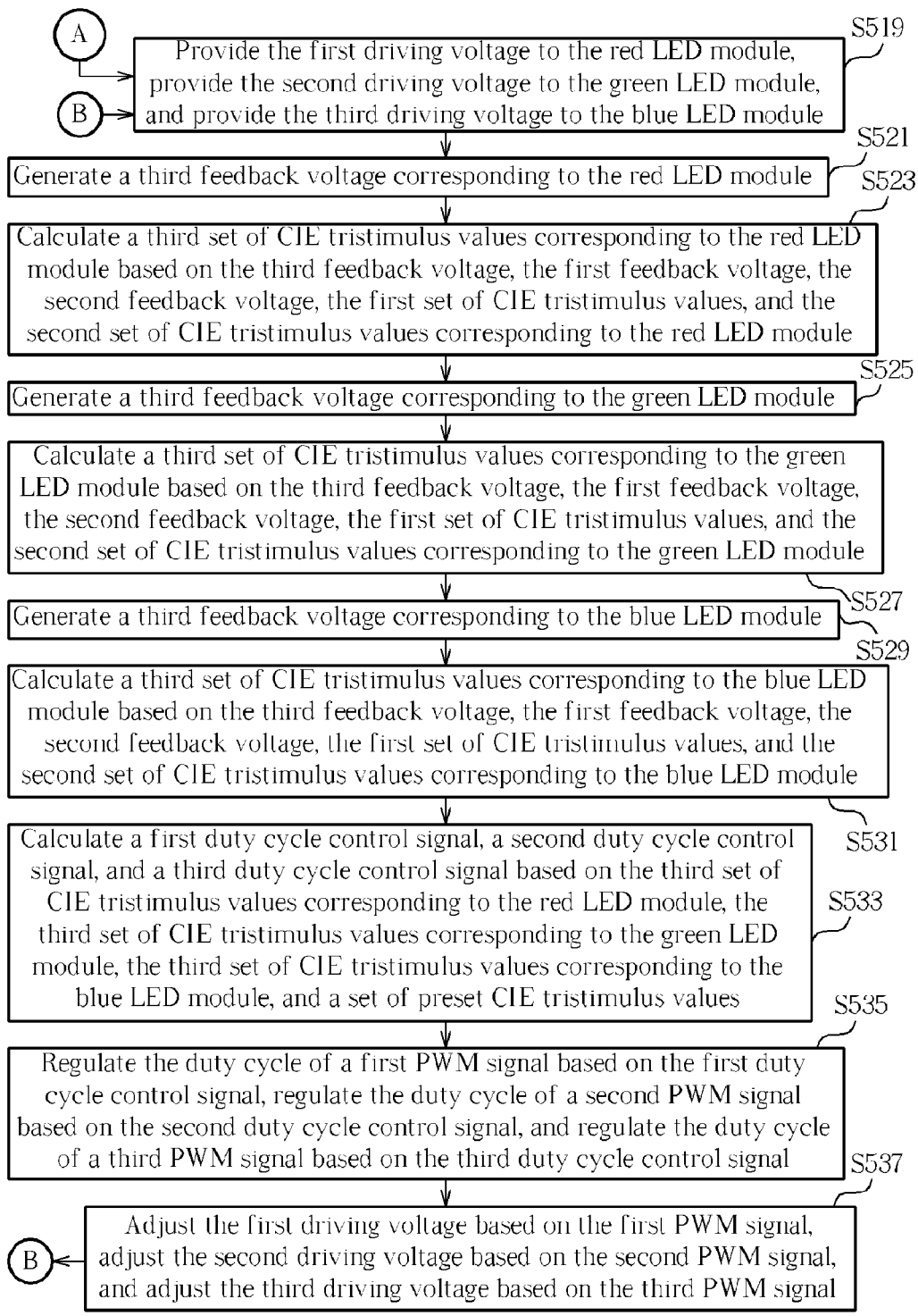

FIGS. 7 and 8 present a flowchart depicting a color control method based on the LED lighting system 300 shown in FIG. 3. The color control method comprises:

Step S501: provide a first driving voltage Vr to the red LED module 301 by the red LED driving circuit 311 during a first interval;

Step S503: generate a first feedback voltage V1a corresponding to the red LED module 301 through performing a signal amplifying operation on a first voltage drop of the first resistor Rr having a first current flowing through the red LED module 301 by the first signal amplifier 315, and generate a first set of CIE tristimulus values X1a, Y1a, and Z1a corresponding to the red LED module 301 through detecting the light emitted from the red LED module 301 by the CIE tristimulus colorimeter 390 at a first time of the first interval;

Step S505: generate a second feedback voltage V1b corresponding to the red LED module 301 through performing a signal amplifying operation on a second voltage drop of the first resistor Rr having a second current flowing through the red LED module 301 by the first signal amplifier 315, and generate a second set of CIE tristimulus values X1b, Y1b, and Z1b corresponding to the red LED module 301 through detecting the light emitted from the red LED module 301 by the CIE tristimulus colorimeter 390 at a second time of the first interval;

Step S507: provide a second driving voltage Vg to the green LED module 302 by the green LED driving circuit 312 during a second interval;

Step S509: generate a first feedback voltage V2a corresponding to the green LED module 302 through performing a signal amplifying operation on a first voltage drop of the second resistor Rg having a first current flowing through the green LED module 302 by the second signal amplifier 320, and generate a first set of CIE tristimulus values X2a, Y2a, and Z2a corresponding to the green LED module 302 through detecting the light emitted from the green LED module 302 by the CIE tristimulus colorimeter 390 at a first time of the second interval;

Step S511: generate a second feedback voltage V2b corresponding to the green LED module 302 through performing a signal amplifying operation on a second voltage drop of the second resistor Rg having a second current flowing through the green LED module 302 by the second signal amplifier 320, and generate a second set of CIE tristimulus values X2b, Y2b, and Z2b corresponding to the green LED module 302 through detecting the light emitted from the green LED module 302 by the CIE tristimulus colorimeter 390 at a second time of the second interval;

Step S513: provide a third driving voltage Vb to the blue LED module 303 by the blue LED driving circuit 313 during a third interval;

Step S515: generate a first feedback voltage V3a corresponding to the blue LED module 303 through performing a signal amplifying operation on a first voltage drop of the third resistor Rb having a first current flowing through the blue LED module 303 by the third signal amplifier 325, and generate a first set of CIE tristimulus values X3a, Y3a, and Z3a corresponding to the blue LED module 303 through detecting the light emitted from the blue LED module 303 by the CIE tristimulus colorimeter 390 at a first time of the third interval;

Step S517: generate a second feedback voltage V3b corresponding to the blue LED module 303 through performing a signal amplifying operation on a second voltage drop of the third resistor Rb having a second current flowing through the blue LED module 303 by the third signal amplifier 325, and generate a second set of CIE tristimulus values X3b, Y3b, and Z3b corresponding to the blue LED module 303 through detecting the light emitted from the blue LED module 303 by the CIE tristimulus colorimeter 390 at a second time of the third interval;

Step S519: provide the first driving voltage Vr to the red LED module 301 by the red LED driving circuit 311, provide the second driving voltage Vg to the green LED module 302 by the green LED driving circuit 312, and provide the third driving voltage Vb to the blue LED module 303 by the blue LED driving circuit 313;

Step S521: generate a third feedback voltage V1t corresponding to the red LED module 301 through performing a signal amplifying operation on a third voltage drop of the first resistor Rr having a third current flowing through the red LED module 301 by the first signal amplifier 315;

Step S523: calculate a third set of CIE tristimulus values X1t, Y1t, and Z1t corresponding to the red LED module 301 based on the third feedback voltage V1t, the first feedback voltage V1a, the second feedback voltage V1b, the first set of CIE tristimulus values X1a, Y1a, and Z1a, and the second set of CIE tristimulus values X1b, Y1b, and Z1b corresponding to the red LED module 301 by the signal processor 355 according to the formulas (21), (22), and (23) listed below:

$$\frac{V1a - V1b}{X1a - X1b} = \frac{V1a - V1t}{X1a - X1t}, \quad \text{Formula (21)}$$

$$\frac{V1a - V1b}{Y1a - Y1b} = \frac{V1a - V1t}{Y1a - Y1t}, \quad \text{Formula (22)}$$

-continued and $$\frac{V1a-V1b}{Z1a-Z1b}=\frac{V1a-V1t}{Z1a-Z1t};\qquad \text{Formula (23)}$$

Step S525: generate a third feedback voltage V2t corresponding to the green LED module 302 through performing a signal amplifying operation on a third voltage drop of the second resistor Rg having a third current flowing through the green LED module 302 by the second signal amplifier 320;

Step S527: calculate a third set of CIE tristimulus values X2t, Y2t, and Z2t corresponding to the green LED module 302 based on the third feedback voltage V2t, the first feedback voltage V2a, the second feedback voltage V2b, the first set of CIE tristimulus values X2a, Y2a, and Z2a, and the second set of CIE tristimulus values X2b, Y2b, and Z2b corresponding to the green LED module 302 by the signal processor 355 according to the formulas (24), (25), and (26) listed below:

$$\frac{V2a-V2b}{X2a-X2b}=\frac{V2a-V2t}{X2a-X2t},\qquad \text{Formula (24)}$$

$$\frac{V2a-V2b}{Y2a-Y2b}=\frac{V2a-V2t}{Y2a-Y2t},\qquad \text{Formula (25)}$$

and $$\frac{V2a-V2b}{Z2a-Z2b}=\frac{V2a-V2t}{Z2a-Z2t};\qquad \text{Formula (26)}$$

Step S529: generate a third feedback voltage V3t corresponding to the blue LED module 303 through performing a signal amplifying operation on a third voltage drop of the third resistor Rb having a third current flowing through the blue LED module 303 by the third signal amplifier 325;

Step S531: calculate a third set of CIE tristimulus values X3t, Y3t, and Z3t corresponding to the blue LED module 303 based on the third feedback voltage V3t, the first feedback voltage V3a, the second feedback voltage V3b, the first set of CIE tristimulus values X3a, Y3a, and Z3a, and the second set of CIE tristimulus values X3b, Y3b, and Z3b corresponding to the blue LED module 303 by the signal processor 355 according to the formulas (27), (28), and (29) listed below:

$$\frac{V3a-V3b}{X3a-X3b}=\frac{V3a-V3t}{X3a-X3t},\qquad \text{Formula (27)}$$

$$\frac{V3a-V3b}{Y3a-Y3b}=\frac{V3a-V3t}{Y3a-Y3t},\qquad \text{Formula (28)}$$

and $$\frac{V3a-V3b}{Z3a-Z3b}=\frac{V3a-V3t}{Z3a-Z3t};\qquad \text{Formula (29)}$$

Step S533: calculate a first duty cycle control signal Pr, a second duty cycle control signal Pg, and a third duty cycle control signal Pb based on the third set of CIE tristimulus values X1t, Y1t, and Z1t corresponding to the red LED module 301, the third set of CIE tristimulus values X2t, Y2t, and Z2t corresponding to the green LED module 302, the third set of CIE tristimulus values X3t, Y3t, and Z3t corresponding to the blue LED module 303, and a set of preset CIE tristimulus values Xpreset, Ypreset, and Zpreset by the signal processor 355 according to the formulas (30), (31), and (32) listed below:

$$PrX1t+PgX2t+PbX3t=Xpreset \qquad \text{Formula (30),}$$

$$PrY1t+PgY2t+PbY3t=Ypreset \qquad \text{Formula (31), and}$$

$$PrZ1t+PgZ2t+PbZ3t=Zpreset \qquad \text{Formula (32);}$$

Step S535: regulate the duty cycle of a first PWM signal based on the first duty cycle control signal Pr by the first PWM signal generator 371, regulate the duty cycle of a second PWM signal based on the second duty cycle control signal Pg by the second PWM signal generator 372, and regulate the duty cycle of a third PWM signal based on the third duty cycle control signal Pb by the third PWM signal generator 373; and Step S537: adjust the first driving voltage Vr based on the first PWM signal by the red LED driving circuit 311, adjust the second driving voltage Vg based on the second PWM signal by the green LED driving circuit 312, and adjust the third driving voltage Vb based on the third PWM signal by the blue LED driving circuit 313, go back to step S519.

The color control method based on the LED lighting system 300 comprises a preliminary detection phase and a feedback control phase. The preliminary detection phase including the steps from S501 to S517 is utilized to detect the current-related voltage drop of each LED module and the corresponding CIE tristimulus values. The first interval, the second interval, and the third interval are not overlapped between each other. The feedback control phase including the steps from S519 to S537 is utilized to precisely control the light emitted form each LED module through regulating the driving voltage for each LED module by performing compensation operations based on the current-related voltage drop variations in conjunction with the CIE tristimulus values generated in the preliminary detection phase.

Similarly, since the CIE tristimulus calorimeter 390 is used only in the preliminary detection phase, the CIE tristimulus calorimeter 390 can be detached from the LED lighting system 300 at the completion of the step S517.

Figure 9:
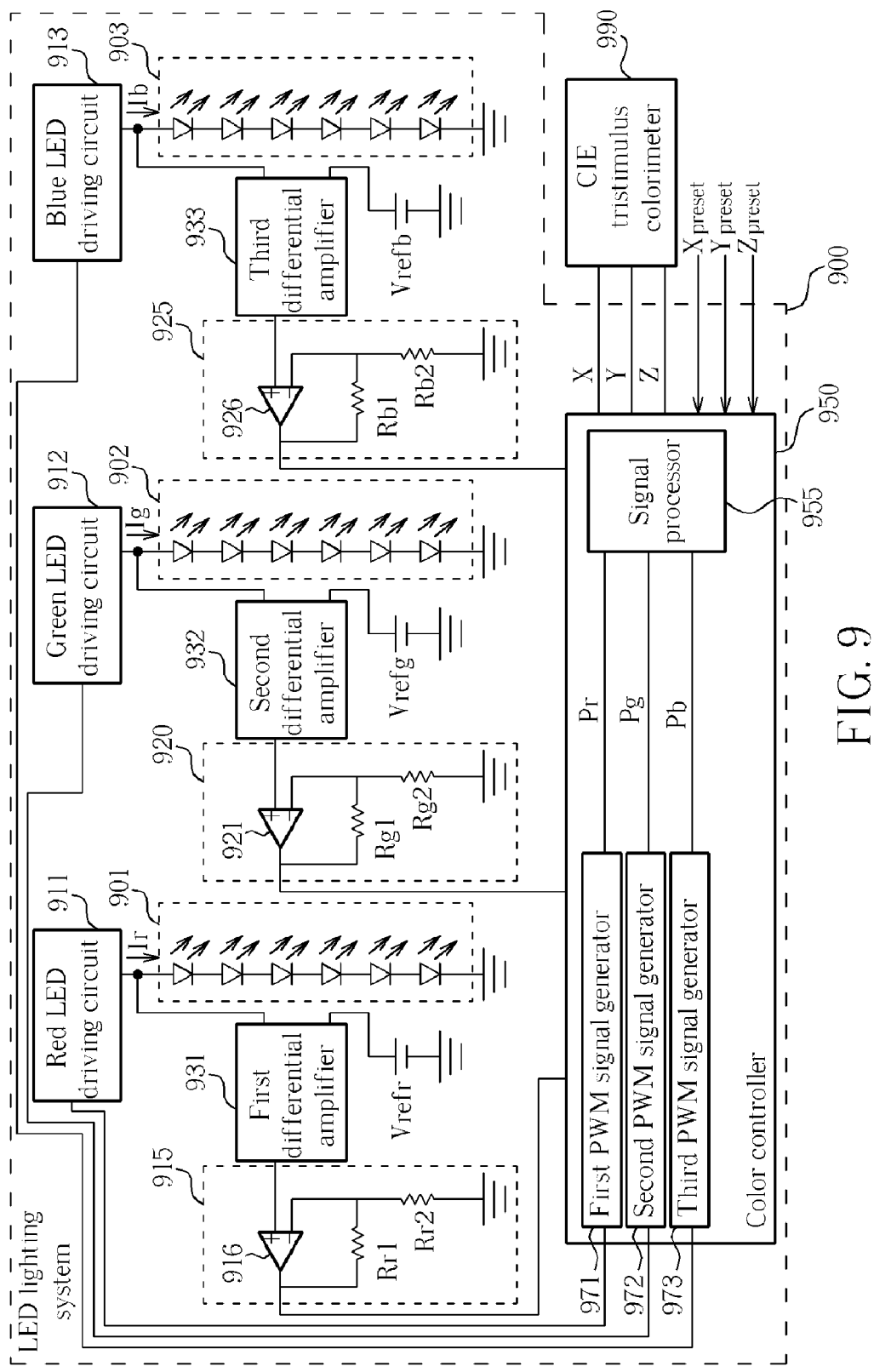
FIG. 9 is a functional block diagram schematically showing an LED lighting system having color control mechanism in accordance with a third embodiment of the present invention.

FIG. 9 is a functional block diagram schematically showing an LED lighting system 900 having color control mechanism in accordance with a third embodiment of the present invention. The LED lighting system 900 comprises a red LED module 901, a green LED module 902, a blue LED module 903, a red LED driving circuit 911, a green LED driving circuit 912, a blue LED driving circuit 913, a first signal amplifier 915, a second signal amplifier 920, a third signal amplifier 925, a first differential amplifier 931, a second differential amplifier 932, a third differential amplifier 933, and a color controller 950.

The red LED driving circuit 911 functions as a current driving circuit and is coupled to the red LED module 901 for providing a first driving current Ir. The green LED driving circuit 912 functions as a current driving circuit and is coupled to the green LED module 902 for providing a second driving current Ig. The blue LED driving circuit 913 functions as a current driving circuit and is coupled to the blue LED module 903 for providing a third driving current Ib.

The first differential amplifier 931 is coupled to the red LED module 901 for generating a first differential voltage by performing a differential amplifying operation on a first reference voltage Vrefr and a first voltage drop corresponding to the red LED module 901. The first signal amplifier 915 is coupled to the first differential amplifier 931 for generating a first feedback voltage by performing a signal amplifying operation on the first differential voltage.

The second differential amplifier 932 is coupled to the green LED module 902 for generating a second differential voltage by performing a differential amplifying operation on a second reference voltage Vrefg and a second voltage drop corresponding to the green LED module 902. The second signal amplifier 920 is coupled to the second differential amplifier 932 for generating a second feedback voltage by performing a signal amplifying operation on the second differential voltage.

The third differential amplifier 933 is coupled to the blue LED module 903 for generating a third differential voltage by performing a differential amplifying operation on a third reference voltage Vrefb and a third voltage drop corresponding to the blue LED module 903. The third signal amplifier 925 is coupled to the third differential amplifier 933 for generating a third feedback voltage by performing a signal amplifying operation on the third differential voltage.

The first signal amplifier 915 can be a non-inverting amplifying circuit comprising an operational amplifier 916, a resistor Rr1, and a resistor Rr2. The second signal amplifier 920 can be a non-inverting amplifying circuit comprising an operational amplifier 921, a resistor Rg1, and a resistor Rg2. The third signal amplifier 925 can be a non-inverting amplifying circuit comprising an operational amplifier 926, a resistor Rb1, and a resistor Rb2.

In one embodiment, the first signal amplifier 915, the second signal amplifier 920, and the third signal amplifier 925 can be omitted. That is, the first, second, and third differential voltages can be forwarded directly to the color controller 950 and function as the first, second, and third feedback voltages respectively. In another embodiment, the first differential amplifier 931, the second differential amplifier 932, and the third differential amplifier 933 can be omitted. That is, the first signal amplifier 915, the second signal amplifier 920, and the third signal amplifier 925 can be coupled directly to the red LED module 901, the green LED module 902, and the blue LED module 903 respectively, and the first, second, and third feedback voltages can be generated by performing signal amplifying operations directly on the first, second, and third voltage drops respectively.

The color controller 950 comprises a signal processor 955, a first PWM signal generator 971, a second PWM signal generator 972, and a third PWM signal generator 973. The signal processor 955 is utilized to generate a first duty cycle control signal Pr, a second duty cycle control signal Pg, and a third duty cycle control signal Pb based on the first feedback voltage, the second feedback voltage, the third feedback voltage, the set of CIE tristimulus values X, Y, and Z, and a set of preset CIE tristimulus values Xpreset, Ypreset, and Zpreset.

The first PWM signal generator 971 is coupled between the signal processor 955 and the red LED driving circuit 911 for regulating the duty cycle of a first PWM signal based on the first duty cycle control signal Pr. The first PWM signal is forwarded to the red LED driving circuit 911 for adjusting the first driving current Ir. The second PWM signal generator 972 is coupled between the signal processor 955 and the green LED driving circuit 912 for regulating the duty cycle of a second PWM signal based on the second duty cycle control signal Pg. The second PWM signal is forwarded to the green LED driving circuit 912 for adjusting the second driving current Ig. The third PWM signal generator 973 is coupled between the signal processor 955 and the blue LED driving circuit 913 for regulating the duty cycle of a third PWM signal based on the third duty cycle control signal Pb. The third PWM signal is forwarded to the blue LED driving circuit 913 for adjusting the third driving current Ib.

In the operation of the LED lighting system 900, as the wavelength shift of the light emitted from the red LED module 901, the green LED module 902, or the blue LED module 903 occurs due to temperature variation, the first, second, or third feedback voltage is changed accordingly. For that reason, the light generated by the red LED module 901, the green LED module 902, or the blue LED module 903 can be controlled precisely based on the first, second, or third feedback voltage. A corresponding color control method based on the LED lighting system 900 will be detailed below.

Figure 10:
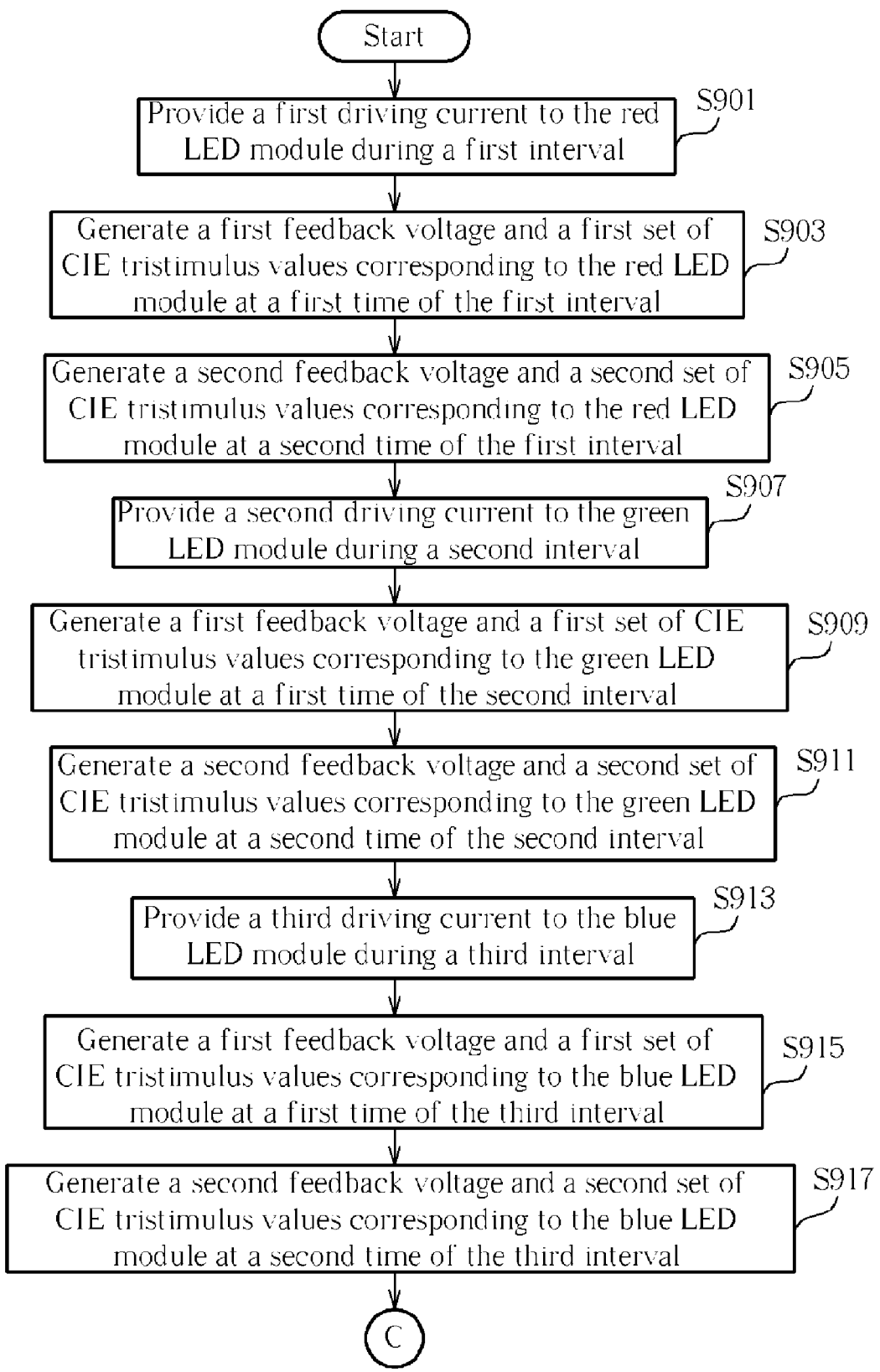
FIGS. 10 and 11 present a flowchart depicting a color control method based on the LED lighting system shown in FIG. 9.
Figure 11:
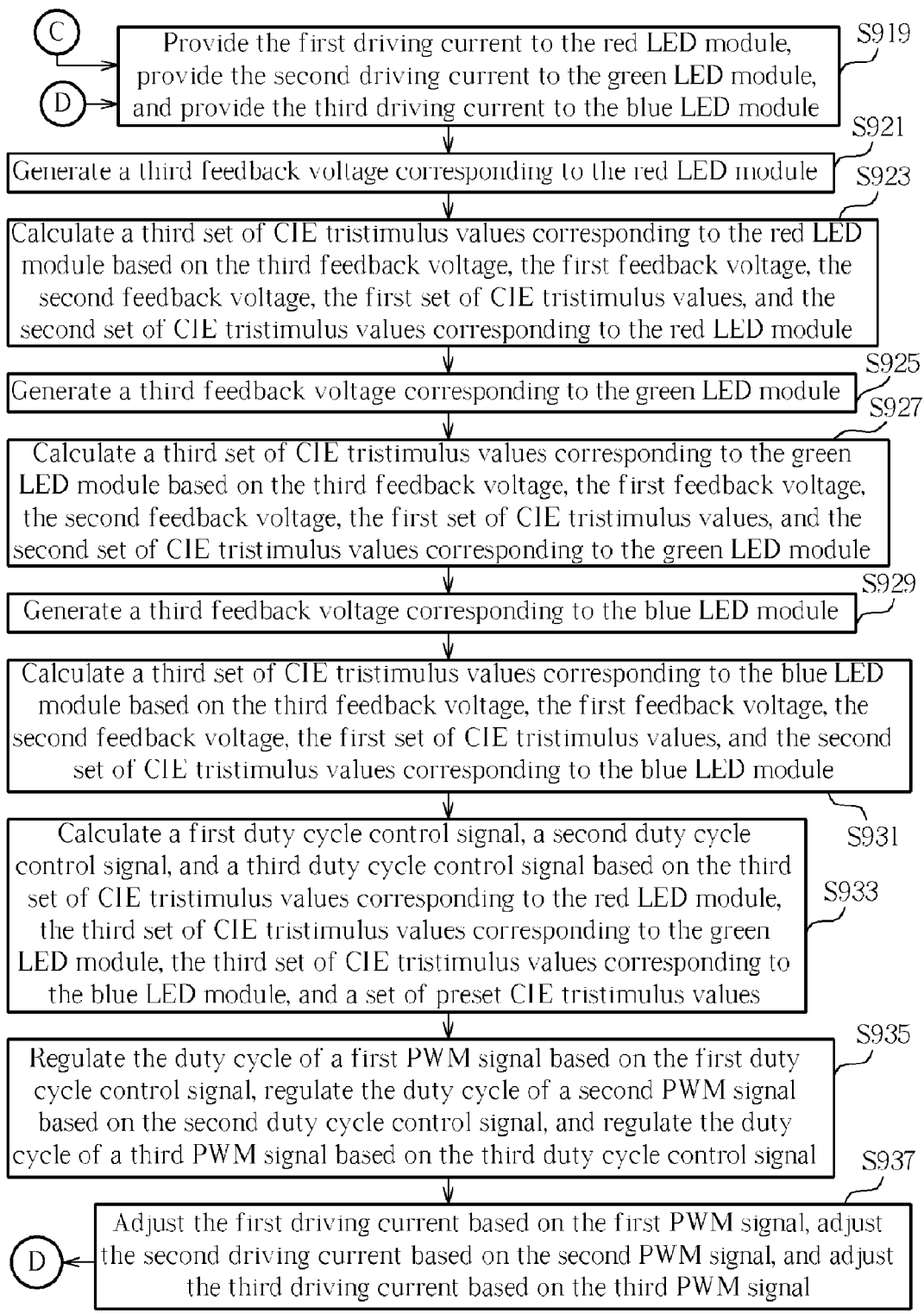

FIGS. 10 and 11 present a flowchart depicting a color control method based on the LED lighting system 900 shown in FIG. 9. The color control method comprises:

Step S901: provide a first driving current Ir to the red LED module 901 by the red LED driving circuit 911 during a first interval;

Step S903: generate a first feedback voltage V1a corresponding to the red LED module 901 through performing differential amplifying and signal amplifying operations on a first voltage drop corresponding to the red LED module 901 by the first differential amplifier 931 and the first signal amplifier 915, and generate a first set of CIE tristimulus values X1a, Y1a, and Z1a corresponding to the red LED module 901 through detecting the light emitted from the red LED module 901 by the CIE tristimulus colorimeter 990 at a first time of the first interval;

Step S905: generate a second feedback voltage V1b corresponding to the red LED module 901 through performing differential amplifying and signal amplifying operations on a second voltage drop corresponding to the red LED module 901 by the first differential amplifier 931 and the first signal amplifier 915, and generate a second set of CIE tristimulus values X1b, Y1b, and Z1b corresponding to the red LED module 901 through detecting the light emitted from the red LED module 901 by the CIE tristimulus colorimeter 990 at a second time of the first interval;

Step S907: provide a second driving current Ig to the green LED module 902 by the green LED driving circuit 912 during a second interval;

Step S909: generate a first feedback voltage V2a corresponding to the green LED module 902 through performing differential amplifying and signal amplifying operations on a first voltage drop corresponding to the green LED module 902 by the second differential amplifier 932 and the second signal amplifier 920, and generate a first set of CIE tristimulus values X2a, Y2a, and Z2a corresponding to the green LED module 902 through detecting the light emitted from the green LED module 902 by the CIE tristimulus colorimeter 990 at a first time of the second interval;

Step S911: generate a second feedback voltage V2b corresponding to the green LED module 902 through performing differential amplifying and signal amplifying operations on a second voltage drop corresponding to the green LED module 902 by the second differential amplifier 932 and the second signal amplifier 920, and generate a second set of CIE tristimulus values X2b, Y2b, and Z2b corresponding to the green LED module 902 through detecting the light emitted from the green LED module 902 by the CIE tristimulus colorimeter 990 at a second time of the second interval;

Step S913: provide a third driving current Ib to the blue LED module 903 by the blue LED driving circuit 913 during a third interval;

Step S915: generate a first feedback voltage V3a corresponding to the blue LED module 903 through performing differential amplifying and signal amplifying operations on a first voltage drop corresponding to the blue LED module 903 by the third differential amplifier 933 and the third signal amplifier 925, and generate a first set of CIE tristimulus values X3a, Y3a, and Z3a corresponding to the blue LED module 903 through detecting the light emitted from the blue LED module 903 by the CIE tristimulus calorimeter 990 at a first time of the third interval;

Step S917: generate a second feedback voltage V3b corresponding to the blue LED module 903 through performing differential amplifying and signal amplifying operations on a second voltage drop corresponding to the blue LED module 903 by the third differential amplifier 933 and the third signal amplifier 925, and generate a second set of CIE tristimulus values X3b, Y3b, and Z3b corresponding to the blue LED module 903 through detecting the light emitted from the blue LED module 903 by the CIE tristimulus calorimeter 990 at a second time of the third interval;

Step S919: provide the first driving current Ir to the red LED module 901 by the red LED driving circuit 911, provide the second driving current Ig to the green LED module 902 by the green LED driving circuit 912, and provide the third driving current Ib to the blue LED module 903 by the blue LED driving circuit 913;

Step S921: generate a third feedback voltage V1t corresponding to the red LED module 901 through performing differential amplifying and signal amplifying operations on a third voltage drop corresponding to the red LED module 901 by the first differential amplifier 931 and the first signal amplifier 915;

Step S923: calculate a third set of CIE tristimulus values X1t, Y1t, and Z1t corresponding to the red LED module 901 based on the third feedback voltage V1t, the first feedback voltage V1a, the second feedback voltage V1b, the first set of CIE tristimulus values X1a, Y1a, and Z1a, and the second set of CIE tristimulus values X1b, Y1b, and Z1b corresponding to the red LED module 901 by the signal processor 955 according to the formulas (33), (34), and (35) listed below:

$$\frac{V1a - V1b}{X1a - X1b} = \frac{V1a - V1t}{X1a - X1t}, \quad \text{Formula (33)}$$

$$\frac{V1a - V1b}{Y1a - Y1b} = \frac{V1a - V1t}{Y1a - Y1t}, \quad \text{Formula (34)}$$

and $$\frac{V1a - V1b}{Z1a - Z1b} = \frac{V1a - V1t}{Z1a - Z1t}; \quad \text{Formula (35)}$$

Step S925: generate a third feedback voltage V2t corresponding to the green LED module 902 through performing differential amplifying and signal amplifying operations on a third voltage drop corresponding to the green LED module 902 by the second differential amplifier 932 and the second signal amplifier 920;

Step S927: calculate a third set of CIE tristimulus values X2t, Y2t, and Z2t corresponding to the green LED module 902 based on the third feedback voltage V2t, the first feedback voltage V2a, the second feedback voltage V2b, the first set of CIE tristimulus values X2a, Y2a, and Z2a, and the second set of CIE tristimulus values X2b, Y2b, and Z2b corresponding to the green LED module 902 by the signal processor 955 according to the formulas (36), (37), and (38) listed below:

$$\frac{V2a - V2b}{X2a - X2b} = \frac{V2a - V2t}{X2a - X2t}, \quad \text{Formula (36)}$$

$$\frac{V2a - V2b}{Y2a - Y2b} = \frac{V2a - V2t}{Y2a - Y2t}, \quad \text{Formula (37)}$$

and $$\frac{V2a - V2b}{Z2a - Z2b} = \frac{V2a - V2t}{Z2a - Z2t}; \quad \text{Formula (38)}$$

Step S929: generate a third feedback voltage V3t corresponding to the blue LED module 903 through performing differential amplifying and signal amplifying operations on a third voltage drop corresponding to the blue LED module 903 by the third differential amplifier 933 and the third signal amplifier 925;

Step S931: calculate a third set of CIE tristimulus values X3t, Y3t, and Z3t corresponding to the blue LED module 903 based on the third feedback voltage V3t, the first feedback voltage V3a, the second feedback voltage V3b, the first set of CIE tristimulus values X3a, Y3a, and Z3a, and the second set of CIE tristimulus values X3b, Y3b, and Z3b corresponding to the blue LED module 903 by the signal processor 955 according to the formulas (39), (40), and (41) listed below:

$$\frac{V3a - V3b}{X3a - X3b} = \frac{V3a - V3t}{X3a - X3t}, \quad \text{Formula (39)}$$

$$\frac{V3a - V3b}{Y3a - Y3b} = \frac{V3a - V3t}{Y3a - Y3t}, \quad \text{Formula (40)}$$

and $$\frac{V3a - V3b}{Z3a - Z3b} = \frac{V3a - V3t}{Z3a - Z3t}; \quad \text{Formula (41)}$$

Step S933: calculate a first duty cycle control signal Pr, a second duty cycle control signal Pg, and a third duty cycle control signal Pb based on the third set of CIE tristimulus values X1t, Y1t, and Z1t corresponding to the red LED module 901, the third set of CIE tristimulus values X2t, Y2t, and Z2t corresponding to the green LED module 902, the third set of CIE tristimulus values X3t, Y3t, and Z3t corresponding to the blue LED module 903, and a set of preset CIE tristimulus values Xpreset, Ypreset, and Zpreset by the signal processor 955 according to the formulas (42), (43), and (44) listed below:

$$PrX1t + PgX2t + PbX3t = X\text{preset} \quad \text{Formula (42)},$$

$$PrY1t + PgY2t + PbY3t = Y\text{preset} \quad \text{Formula (43), and}$$

$$PrZ1t + PgZ2t + PbZ3t = Z\text{preset} \quad \text{Formula (44)};$$

Step S935: regulate the duty cycle of a first PWM signal based on the first duty cycle control signal Pr by the first PWM signal generator 971, regulate the duty cycle of a second PWM signal based on the second duty cycle control signal Pg by the second PWM signal generator 972, and regulate the duty cycle of a third PWM signal based on the third duty cycle control signal Pb by the third PWM signal generator 973; and Step S937: adjust the first driving current Ir based on the first PWM signal by the red LED driving circuit 911, adjust the second driving current Ig based on the second PWM signal by the green LED driving circuit 912, and adjust the third driving current Ib based on the third PWM signal by the blue LED driving circuit 913, go back to step S919.

The color control method based on the LED lighting system 900 comprises a preliminary detection phase and a feedback control phase. The preliminary detection phase including the steps from S901 to S917 is utilized to detect the voltage drop of each LED module and the corresponding CIE tristimulus values. The first interval, the second interval, and the third interval are not overlapped between each other. The feedback control phase including the steps from S919 to S937 is utilized to precisely control the light emitted form each LED module through regulating the driving current for each LED module by performing compensation operations based on the voltage drop variations in conjunction with the CIE tristimulus values generated in the preliminary detection phase.

In the steps S903, S905, and S921, the processes of performing differential amplifying and signal amplifying operations on the first, second, and third voltage drops corresponding to the red LED module 901 by the first differential amplifier 931 and the first signal amplifier 915 can be simplified to be the processes of performing differential amplifying operations on the first, second, and third voltage drops corresponding to the red LED module 901 in conjunction with the first reference voltage Vrefr by the first differential amplifier 931, or alternatively, the processes of performing signal amplifying operations on the first, second, and third voltage drops corresponding to the red LED module 901 by the first signal amplifier 915.

Similarly, in the steps S909, S911, and S925, the processes of performing differential amplifying and signal amplifying operations on the first, second, and third voltage drops corresponding to the green LED module 902 by the second differential amplifier 932 and the second signal amplifier 920 can be simplified to be the processes of performing differential amplifying operations on the first, second, and third voltage drops corresponding to the green LED module 902 in conjunction with the second reference voltage Vrefg by the second differential amplifier 932, or alternatively, the processes of performing signal amplifying operations on the first, second, and third voltage drops corresponding to the green LED module 902 by the second signal amplifier 920.

Likewise, in the steps S915, S917, and S929, the processes of performing differential amplifying and signal amplifying operations on the first, second, and third voltage drops corresponding to the blue LED module 903 by the third differential amplifier 933 and the third signal amplifier 925 can be simplified to be the processes of performing differential amplifying operations on the first, second, and third voltage drops corresponding to the blue LED module 903 in conjunction with the third reference voltage Vrefb by the third differential amplifier 933, or alternatively, the processes of performing signal amplifying operations on the first, second, and third voltage drops corresponding to the blue LED module 903 by the third signal amplifier 925.

Since the CIE tristimulus calorimeter 990 is used only in the preliminary detection phase, the CIE tristimulus calorimeter 990 can be detached from the LED lighting system 900 at the completion of the step S917.

In summary, the color control methods of the present invention are capable of providing accurate lighting controls on a variety of different LED lighting systems. Especially when temperature variation occurs to the LED dice of an LED lighting system, the temperature-related wavelength shift can be compensated by a feedback control mechanism based on voltage drop variation or current variation of the LED dice so that the LED lighting system is able to generate the light having desired chrominance precisely.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A color control method for an LED lighting system, the LED lighting system comprising a red LED module, a green LED module, and a blue LED module, the color control method comprising:

providing a first driving current to the red LED module during a first interval;

generating a first feedback voltage corresponding to the red LED module based on a first voltage drop corresponding to the red LED module, and generating a first red light signal, a first green light signal, a first blue light signal, and a first set of CIE tristimulus values corresponding to the red LED module through detecting light emitted from the red LED module at a first time of the first interval;

generating a second feedback voltage corresponding to the red LED module based on a second voltage drop corresponding to the red LED module, and generating a second red light signal, a second green light signal, a second blue light signal, and a second set of CIE tristimulus values corresponding to the red LED module through detecting light emitted from the red LED module at a second time of the first interval;

providing a second driving current to the green LED module during a second interval;

generating a first feedback voltage corresponding to the green LED module based on a first voltage drop corresponding to the green LED module, and generating a first red light signal, a first green light signal, a first blue light signal, and a first set of CIE tristimulus values corresponding to the green LED module through detecting light emitted from the green LED module at a first time of the second interval;

generating a second feedback voltage corresponding to the green LED module based on a second voltage drop corresponding to the green LED module, and generating a second red light signal, a second green light signal, a second blue light signal, and a second set of CIE tristimulus values corresponding to the green LED module through detecting light emitted from the green LED module at a second time of the second interval;

providing a third driving current to the blue LED module during a third interval;

generating a first feedback voltage corresponding to the blue LED module based on a first voltage drop corresponding to the blue LED module, and generating a first red light signal, a first green light signal, a first blue light signal, and a first set of CIE tristimulus values corresponding to the blue LED module through detecting light emitted from the blue LED module at a first time of the third interval;

generating a second feedback voltage corresponding to the blue LED module based on a second voltage drop corresponding to the blue LED module, and generating a second red light signal, a second green light signal, a second blue light signal, and a second set of CIE tristimulus values corresponding to the blue LED module through detecting light emitted from the blue LED module at a second time of the third interval;

providing the first driving current to the red LED module, providing the second driving current to the green LED module, and providing the third driving current to the blue LED module;

generating a third feedback voltage corresponding to the red LED module based on a third voltage drop corresponding to the red LED module;

generating a third set of CIE tristimulus values corresponding to the red LED module based on the third feedback voltage, the first feedback voltage, the second feedback voltage, the first set of CIE tristimulus values, and the second set of CIE tristimulus values corresponding to the red LED module;

generating a third red light signal, a third green light signal, and a third blue light signal corresponding to the red LED module based on the third feedback voltage, the first feedback voltage, the second feedback voltage, the first red light signal, the first green light signal, the first blue light signal, the second red light signal, the second green light signal, the second blue light signal corresponding to the red LED module;

generating a third feedback voltage corresponding to the green LED module based on a third voltage drop corresponding to the green LED module;

generating a third set of CIE tristimulus values corresponding to the green LED module based on the third feedback voltage, the first feedback voltage, the second feedback voltage, the first set of CIE tristimulus values, and the second set of CIE tristimulus values corresponding to the green LED module;

generating a third red light signal, a third green light signal, and a third blue light signal corresponding to the green LED module based on the third feedback voltage, the first feedback voltage, the second feedback voltage, the first red light signal, the first green light signal, the first blue light signal, the second red light signal, the second green light signal, the second blue light signal corresponding to the green LED module;

generating a third feedback voltage corresponding to the blue LED module based on a third voltage drop corresponding to the blue LED module;

generating a third set of CIE tristimulus values corresponding to the blue LED module based on the third feedback voltage, the first feedback voltage, the second feedback voltage, the first set of CIE tristimulus values, and the second set of CIE tristimulus values corresponding to the blue LED module;

generating a third red light signal, a third green light signal, and a third blue light signal corresponding to the blue LED module based on the third feedback voltage, the first feedback voltage, the second feedback voltage, the first red light signal, the first green light signal, the first blue light signal, the second red light signal, the second green light signal, the second blue light signal corresponding to the blue LED module;

calculating a first coefficient matrix based on the third set of CIE tristimulus values, the third red light signal, the third green light signal, and the third blue light signal corresponding to the red LED module, the third set of CIE tristimulus values, the third red light signal, the third green light signal, and the third blue light signal corresponding to the green LED module, and the third set of CIE tristimulus values, the third red light signal, the third green light signal, and the third blue light signal corresponding to the blue LED module;

calculating a first control signal, a second control signal, and a third control signal based on the first coefficient matrix and a set of preset CIE tristimulus values; and regulating the first driving current based on the first control signal, regulating the second driving current based on the second control signal, and regulating the third driving current based on the third control signal;

wherein the first interval, the second interval, and the third interval are not overlapped between each other.

2. The color control method of claim 1, wherein generating the first feedback voltage corresponding to the red LED module based on the first voltage drop corresponding to the red LED module is generating the first feedback voltage corresponding to the red LED module by performing a differential amplifying operation on the first voltage drop corresponding to the red LED module and a first reference voltage; generating the second feedback voltage corresponding to the red LED module based on the second voltage drop corresponding to the red LED module is generating the second feedback voltage corresponding to the red LED module by performing a differential amplifying operation on the second voltage drop corresponding to the red LED module and the first reference voltage; generating the first feedback voltage corresponding to the green LED module based on the first voltage drop corresponding to the green LED module is generating the first feedback voltage corresponding to the green LED module by performing a differential amplifying operation on the first voltage drop corresponding to the green LED module and a second reference voltage; generating the second feedback voltage corresponding to the green LED module based on the second voltage drop corresponding to the green LED module is generating the second feedback voltage corresponding to the green LED module by performing a differential amplifying operation on the second voltage drop corresponding to the green LED module and the second reference voltage; generating the first feedback voltage corresponding to the blue LED module based on the first voltage drop corresponding to the blue LED module is generating the first feedback voltage corresponding to the blue LED module by performing a differential amplifying operation on the first voltage drop corresponding to the blue LED module and a third reference voltage; and generating the second feedback voltage corresponding to the blue LED module based on the second voltage drop corresponding to the blue LED module is generating the second feedback voltage corresponding to the blue LED module by performing a differential amplifying operation on the second voltage drop corresponding to the blue LED module and the third reference voltage.

3. The color control method of claim 1, wherein generating the first feedback voltage corresponding to the red LED module based on the first voltage drop corresponding to the red LED module is generating the first feedback voltage corresponding to the red LED module by performing a signal amplifying operation on the first voltage drop corresponding to the red LED module; generating the second feedback voltage corresponding to the red LED module based on the second voltage drop corresponding to the red LED module is generating the second feedback voltage corresponding to the red LED module by performing a signal amplifying operation on the second voltage drop corresponding to the red LED module; generating the first feedback voltage corresponding to the green LED module based on the first voltage drop corresponding to the green LED module is generating the first feedback voltage corresponding to the green LED module by performing a signal amplifying operation on the first voltage drop corresponding to the green LED module; generating the second feedback voltage corresponding to the green LED module based on the second voltage drop corresponding to the green LED module is generating the second feedback voltage corresponding to the green LED module by performing a signal amplifying operation on the second voltage drop corresponding to the green LED module; generating the first feedback voltage corresponding to the blue LED module based on the first voltage drop corresponding to the blue LED module is generating the first feedback voltage corresponding to the blue LED module by performing a signal amplifying operation on the first voltage drop corresponding to the blue LED module; and generating the second feedback voltage corresponding to the blue LED module based on the second voltage drop corresponding to the blue LED module is generating the second feedback voltage corresponding to the blue LED module by performing a signal amplifying operation on the second voltage drop corresponding to the blue LED module.

4. The color control method of claim 1, wherein regulating the first driving current based on the first control signal, regulating the second driving current based on the second control signal, and regulating the third driving current based on the third control signal is regulating the first driving current by regulating a duty cycle of a first pulse width modulation (PWM) signal based on the first control signal; regulating the second driving current by regulating a duty cycle of a second PWM signal based on the second control signal; and regulating the third driving current by regulating a duty cycle of a third PWM signal based on the third control signal.

5. The color control method of claim 4, wherein regulating the first driving current by regulating the duty cycle of the first PWM signal based on the first control signal; regulating the second driving current by regulating the duty cycle of the second PWM signal based on the second control signal; and regulating the third driving current by regulating the duty cycle of the third PWM signal based on the third control signal is generating a fourth red light signal, a fourth green light signal, a fourth blue light signal through detecting light emitted from the red LED module, the green LED module, and the blue LED module, generating a first duty cycle control signal through comparing the first control signal with the fourth red light signal, regulating the first driving current by regulating the duty cycle of the first PWM signal based on the first duty cycle control signal, generating a second duty cycle control signal through comparing the second control signal with the fourth green light signal, regulating the second driving current by regulating the duty cycle of the second PWM signal based on the second duty cycle control signal, generating a third duty cycle control signal through comparing the third control signal with the fourth blue light signal, and regulating the third driving current by regulating the duty cycle of the third PWM signal based on the third duty cycle control signal.

6. The color control method of claim 1, wherein generating the third feedback voltage corresponding to the red LED module based on the third voltage drop corresponding to the red LED module is generating the third feedback voltage corresponding to the red LED module by performing a differential amplifying operation on the third voltage drop corresponding to the red LED module and a first reference voltage; generating the third feedback voltage corresponding to the green LED module based on the third voltage drop corresponding to the green LED module is generating the third feedback voltage corresponding to the green LED module by performing a differential amplifying operation on the third voltage drop corresponding to the green LED module and a second reference voltage; and generating the third feedback voltage corresponding to the blue LED module based on the third voltage drop corresponding to the blue LED module is generating the third feedback voltage corresponding to the blue LED module by performing a differential amplifying operation on the third voltage drop corresponding to the blue LED module and a third reference voltage.

7. The color control method of claim 1, wherein generating the third feedback voltage corresponding to the red LED module based on the third voltage drop corresponding to the red LED module is generating the third feedback voltage corresponding to the red LED module by performing a signal amplifying operation on the third voltage drop corresponding to the red LED module; generating the third feedback voltage corresponding to the green LED module based on the third voltage drop corresponding to the green LED module is generating the third feedback voltage corresponding to the green LED module by performing a signal amplifying operation on the third voltage drop corresponding to the green LED module; and generating the third feedback voltage corresponding to the blue LED module based on the third voltage drop corresponding to the blue LED module is generating the third feedback voltage corresponding to the blue LED module by performing a signal amplifying operation on the third voltage drop corresponding to the blue LED module.

8. The color control method of claim 1, further comprising:
generating a fourth feedback voltage corresponding to the red LED module based on a fourth voltage drop corresponding to the red LED module;
generating a fourth set of CIE tristimulus values corresponding to the red LED module based on the fourth feedback voltage, the first feedback voltage, the second feedback voltage, the first set of CIE tristimulus values, and the second set of CIE tristimulus values corresponding to the red LED module;
generating a fourth red light signal, a fourth green light signal, and a fourth blue light signal corresponding to the red LED module based on the fourth feedback voltage, the first feedback voltage, the second feedback voltage, the first red light signal, the first green light signal, the first blue light signal, the second red light signal, the second green light signal, the second blue light signal corresponding to the red LED module;
generating a fourth feedback voltage corresponding to the green LED module based on a fourth voltage drop corresponding to the green LED module;
generating a fourth set of CIE tristimulus values corresponding to the green LED module based on the fourth feedback voltage, the first feedback voltage, the second feedback voltage, the first set of CIE tristimulus values, and the second set of CIE tristimulus values corresponding to the green LED module;
generating a fourth red light signal, a fourth green light signal, and a fourth blue light signal corresponding to the green LED module based on the fourth feedback voltage, the first feedback voltage, the second feedback voltage, the first red light signal, the first green light signal, the first blue light signal, the second red light signal, the second green light signal, the second blue light signal corresponding to the green LED module;
generating a fourth feedback voltage corresponding to the blue LED module based on a fourth voltage drop corresponding to the blue LED module;

generating a fourth set of CIE tristimulus values corresponding to the blue LED module based on the fourth feedback voltage, the first feedback voltage, the second feedback voltage, the first set of CIE tristimulus values, and the second set of CIE tristimulus values corresponding to the blue LED module;

generating a fourth red light signal, a fourth green light signal, and a fourth blue light signal corresponding to the blue LED module based on the fourth feedback voltage, the first feedback voltage, the second feedback voltage, the first red light signal, the first green light signal, the first blue light signal, the second red light signal, the second green light signal, the second blue light signal corresponding to the blue LED module;

calculating a second coefficient matrix based on the fourth set of CIE tristimulus values, the fourth red light signal, the fourth green light signal, and the fourth blue light signal corresponding to the red LED module, the fourth set of CIE tristimulus values, the fourth red light signal, the fourth green light signal, and the fourth blue light signal corresponding to the green LED module, and the fourth set of CIE tristimulus values, the fourth red light signal, the fourth green light signal, and the fourth blue light signal corresponding to the blue LED module;

calculating a fourth control signal, a fifth control signal, and a sixth control signal based on the first coefficient matrix and the set of preset CIE tristimulus values; and regulating the first driving current based on the fourth control signal, regulating the second driving current based on the fifth control signal, and regulating the third driving current based on the sixth control signal.

9. The color control method of claim 8, wherein regulating the first driving current based on the fourth control signal, regulating the second driving current based on the fifth control signal, and regulating the third driving current based on the sixth control signal is regulating the first driving current by regulating a duty cycle of a first PWM signal based on the fourth control signal; regulating the second driving current by regulating a duty cycle of a second PWM signal based on the fifth control signal; and regulating the third driving current by regulating a duty cycle of a third PWM signal based on the sixth control signal.

10. The color control method of claim 9, wherein regulating the first driving current by regulating the duty cycle of the first PWM signal based on the fourth control signal; regulating the second driving current by regulating the duty cycle of the second PWM signal based on the fifth control signal; and regulating the third driving current by regulating the duty cycle of the third PWM signal based on the sixth control signal is generating a fifth red light signal, a fifth green light signal, a fifth blue light signal through detecting light emitted from the red LED module, the green LED module, and the blue LED module, generating a fourth duty cycle control signal through comparing the fourth control signal with the fifth red light signal, regulating the first driving current by regulating the duty cycle of the first PWM signal based on the fourth duty cycle control signal, generating a fifth duty cycle control signal through comparing the fifth control signal with the fifth green light signal, regulating the second driving current by regulating the duty cycle of the second PWM signal based on the fifth duty cycle control signal, generating a sixth duty cycle control signal through comparing the sixth control signal with the fifth blue light signal, and regulating the third driving current by regulating the duty cycle of the third PWM signal based on the sixth duty cycle control signal.

11. The color control method of claim 8, wherein generating the fourth feedback voltage corresponding to the red LED module based on the fourth voltage drop corresponding to the red LED module is generating the fourth feedback voltage corresponding to the red LED module by performing a differential amplifying operation on the fourth voltage drop corresponding to the red LED module and a first reference voltage; generating the fourth feedback voltage corresponding to the green LED module based on the fourth voltage drop corresponding to the green LED module is generating the fourth feedback voltage corresponding to the green LED module by performing a differential amplifying operation on the fourth voltage drop corresponding to the green LED module and a second reference voltage; and generating the fourth feedback voltage corresponding to the blue LED module based on the fourth voltage drop corresponding to the blue LED module is generating the fourth feedback voltage corresponding to the blue LED module by performing a differential amplifying operation on the fourth voltage drop corresponding to the blue LED module and a third reference voltage.

12. The color control method of claim 8, wherein generating the fourth feedback voltage corresponding to the red LED module based on the fourth voltage drop corresponding to the red LED module is generating the fourth feedback voltage corresponding to the red LED module by performing a signal amplifying operation on the fourth voltage drop corresponding to the red LED module; generating the fourth feedback voltage corresponding to the green LED module based on the fourth voltage drop corresponding to the green LED module is generating the fourth feedback voltage corresponding to the green LED module by performing a signal amplifying operation on the fourth voltage drop corresponding to the green LED module; and generating the fourth feedback voltage corresponding to the blue LED module based on the fourth voltage drop corresponding to the blue LED module is generating the fourth feedback voltage corresponding to the blue LED module by performing a signal amplifying operation on the fourth voltage drop corresponding to the blue LED module.

13. A color control method for an LED lighting system, the LED lighting system comprising a red LED module, a green LED module, and a blue LED module, the color control method comprising:

providing a first driving voltage to the red LED module during a first interval;

generating a first feedback voltage corresponding to the red LED module based on a first current flowing through the red LED module, and generating a first set of CIE tristimulus values corresponding to the red LED module through detecting light emitted from the red LED module at a first time of the first interval;

generating a second feedback voltage corresponding to the red LED module based on a second current flowing through the red LED module, and generating a second set of CIE tristimulus values corresponding to the red LED module through detecting light emitted from the red LED module at a second time of the first interval;

providing a second driving voltage to the green LED module during a second interval;

generating a first feedback voltage corresponding to the green LED module based on a first current flowing through the green LED module, and generating a first set of CIE tristimulus values corresponding to the green LED module through detecting light emitted from the green LED module at a first time of the second interval;

generating a second feedback voltage corresponding to the green LED module based on a second current flowing through the green LED module, and generating a second set of CIE tristimulus values corresponding to the green LED module through detecting light emitted from the green LED module at a second time of the second interval;

providing a third driving voltage to the blue LED module during a third interval;

generating a first feedback voltage corresponding to the blue LED module based on a first current flowing through the blue LED module, and generating a first set of CIE tristimulus values corresponding to the blue LED module through detecting light emitted from the blue LED module at a first time of the third interval;

generating a second feedback voltage corresponding to the blue LED module based on a second current flowing through the blue LED module, and generating a second set of CIE tristimulus values corresponding to the blue LED module through detecting light emitted from the blue LED module at a second time of the third interval;

providing the first driving voltage to the red LED module, providing the second driving voltage to the green LED module, and providing the third driving voltage to the blue LED module;

generating a third feedback voltage corresponding to the red LED module based on a third current flowing through the red LED module;

generating a third set of CIE tristimulus values corresponding to the red LED module based on the third feedback voltage, the first feedback voltage, the second feedback voltage, the first set of CIE tristimulus values, and the second set of CIE tristimulus values corresponding to the red LED module;

generating a third feedback voltage corresponding to the green LED module based on a third current flowing through the green LED module;

generating a third set of CIE tristimulus values corresponding to the green LED module based on the third feedback voltage, the first feedback voltage, the second feedback voltage, the first set of CIE tristimulus values, and the second set of CIE tristimulus values corresponding to the green LED module;

generating a third feedback voltage corresponding to the blue LED module based on a third current flowing through the blue LED module;

generating a third set of CIE tristimulus values corresponding to the blue LED module based on the third feedback voltage, the first feedback voltage, the second feedback voltage, the first set of CIE tristimulus values, and the second set of CIE tristimulus values corresponding to the blue LED module;

calculating a first duty cycle control signal, a second duty cycle control signal, and a third duty cycle control signal based on the third set of CIE tristimulus values corresponding to the red LED module, the third set of CIE tristimulus values corresponding to the green LED module, the third set of CIE tristimulus values corresponding to the blue LED module, and a set of preset CIE tristimulus values; and regulating the first driving voltage based on the first duty cycle control signal, regulating the second driving voltage based on the second duty cycle control signal, and regulating the third driving voltage based on the third duty cycle control signal;

wherein the first interval, the second interval, and the third interval are not overlapped between each other.

14. The color control method of claim 13, wherein generating the first feedback voltage corresponding to the red LED module based on the first current flowing through the red LED module is generating the first feedback voltage corresponding to the red LED module through performing a signal amplifying operation on a first voltage drop of a first resistor having the first current flowing through the red LED module; generating the second feedback voltage corresponding to the red LED module based on the second current flowing through the red LED module is generating the second feedback voltage corresponding to the red LED module through performing a signal amplifying operation on a second voltage drop of the first resistor having the second current flowing through the red LED module; generating the first feedback voltage corresponding to the green LED module based on the first current flowing through the green LED module is generating the first feedback voltage corresponding to the green LED module through performing a signal amplifying operation on a first voltage drop of a second resistor having the first current flowing through the green LED module; generating the second feedback voltage corresponding to the green LED module based on the second current flowing through the green LED module is generating the second feedback voltage corresponding to the green LED module through performing a signal amplifying operation on a second voltage drop of the second resistor having the second current flowing through the green LED module; generating the first feedback voltage corresponding to the blue LED module based on the first current flowing through the blue LED module is generating the first feedback voltage corresponding to the blue LED module through performing a signal amplifying operation on a first voltage drop of a third resistor having the first current flowing through the blue LED module; and generating the second feedback voltage corresponding to the blue LED module based on the second current flowing through the blue LED module is generating the second feedback voltage corresponding to the blue LED module through performing a signal amplifying operation on a second voltage drop of the third resistor having the second current flowing through the blue LED module.

15. The color control method of claim 13, wherein regulating the first driving voltage based on the first duty cycle control signal, regulating the second driving voltage based on the second duty cycle control signal, and regulating the third driving voltage based on the third duty cycle control signal is regulating the first driving voltage by regulating the duty cycle of a first PWM signal based on the first duty cycle control signal, regulating the second driving voltage by regulating the duty cycle of a second PWM signal based on the second duty cycle control signal, and regulating the third driving voltage by regulating the duty cycle of a third PWM signal based on the third duty cycle control signal.

16. The color control method of claim 13, wherein generating the third feedback voltage corresponding to the red LED module based on the third current flowing through the red LED module is generating the third feedback voltage corresponding to the red LED module through performing a signal amplifying operation on a voltage drop of a first resistor having the third current flowing through the red LED module; generating the third feedback voltage corresponding to the green LED module based on the third current flowing through the green LED module is generating the third feedback voltage corresponding to the green LED module through performing a signal amplifying operation on a voltage drop of a second resistor having the third current flowing through the green LED module; and generating the third feedback voltage corresponding to the blue LED module based on the third current flowing through the blue LED module is generating the third feedback voltage corresponding to the blue LED module through performing a signal amplifying operation on a voltage drop of a third resistor having the third current flowing through the blue LED module.

17. The color control method of claim 13, further comprising:
generating a fourth feedback voltage corresponding to the red LED module based on a fourth current flowing through the red LED module;
generating a fourth set of CIE tristimulus values corresponding to the red LED module based on the fourth feedback voltage, the first feedback voltage, the second feedback voltage, the first set of CIE tristimulus values, and the second set of CIE tristimulus values corresponding to the red LED module;
generating a fourth feedback voltage corresponding to the green LED module based on a fourth current flowing through the green LED module;
generating a fourth set of CIE tristimulus values corresponding to the green LED module based on the fourth feedback voltage, the first feedback voltage, the second feedback voltage, the first set of CIE tristimulus values, and the second set of CIE tristimulus values corresponding to the green LED module;
generating a fourth feedback voltage corresponding to the blue LED module based on a fourth current flowing through the blue LED module;
generating a fourth set of CIE tristimulus values corresponding to the blue LED module based on the fourth feedback voltage, the first feedback voltage, the second feedback voltage, the first set of CIE tristimulus values, and the second set of CIE tristimulus values corresponding to the blue LED module;
calculating a fourth duty cycle control signal, a fifth duty cycle control signal, and a sixth duty cycle control signal based on the fourth set of CIE tristimulus values corresponding to the red LED module, the fourth set of CIE tristimulus values corresponding to the green LED module, the fourth set of CIE tristimulus values corresponding to the blue LED module, and the set of preset CIE tristimulus values; and
regulating the first driving voltage based on the fourth duty cycle control signal, regulating the second driving voltage based on the fifth duty cycle control signal, and regulating the third driving voltage based on the sixth duty cycle control signal.

18. The color control method of claim 17, wherein regulating the first driving voltage based on the fourth duty cycle control signal, regulating the second driving voltage based on the fifth duty cycle control signal, and regulating the third driving voltage based on the sixth duty cycle control signal is regulating the first driving voltage by regulating the duty cycle of a first PWM signal based on the fourth duty cycle control signal, regulating the second driving voltage by regulating the duty cycle of a second PWM signal based on the fifth duty cycle control signal, and regulating the third driving voltage by regulating the duty cycle of a third PWM signal based on the sixth duty cycle control signal.

19. The color control method of claim 17, wherein generating the fourth feedback voltage corresponding to the red LED module based on the fourth current flowing through the red LED module is generating the fourth feedback voltage corresponding to the red LED module through performing a signal amplifying operation on a voltage drop of a first resistor having the fourth current flowing through the red LED module; generating the fourth feedback voltage corresponding to the green LED module based on the fourth current flowing through the green LED module is generating the fourth feedback voltage corresponding to the green LED module through performing a signal amplifying operation on a voltage drop of a second resistor having the fourth current flowing through the green LED module; and generating the fourth feedback voltage corresponding to the blue LED module based on the fourth current flowing through the blue LED module is generating the fourth feedback voltage corresponding to the blue LED module through performing a signal amplifying operation on a voltage drop of a third resistor having the fourth current flowing through the blue LED module.

20. A color control method for an LED lighting system, the LED lighting system comprising a red LED module, a green LED module, and a blue LED module, the color control method comprising:
providing a first driving current to the red LED module during a first interval;
generating a first feedback voltage corresponding to the red LED module based on a first voltage drop corresponding to the red LED module, and generating a first set of CIE tristimulus values corresponding to the red LED module through detecting light emitted from the red LED module at a first time of the first interval;
generating a second feedback voltage corresponding to the red LED module based on a second voltage drop corresponding to the red LED module, and generating a second set of CIE tristimulus values corresponding to the red LED module through detecting light emitted from the red LED module at a second time of the first interval;
providing a second driving current to the green LED module during a second interval;
generating a first feedback voltage corresponding to the green LED module based on a first voltage drop corresponding to the green LED module, and generating a first set of CIE tristimulus values corresponding to the green LED module through detecting light emitted from the green LED module at a first time of the second interval;
generating a second feedback voltage corresponding to the green LED module based on a second voltage drop corresponding to the green LED module, and generating a second set of CIE tristimulus values corresponding to the green LED module through detecting light emitted from the green LED module at a second time of the second interval;
providing a third driving current to the blue LED module during a third interval;
generating a first feedback voltage corresponding to the blue LED module based on a first voltage drop corresponding to the blue LED module, and generating a first set of CIE tristimulus values corresponding to the blue LED module through detecting light emitted from the blue LED module at a first time of the third interval;
generating a second feedback voltage corresponding to the blue LED module based on a second voltage drop corresponding to the blue LED module, and generating a second set of CIE tristimulus values corresponding to the blue LED module through detecting light emitted from the blue LED module at a second time of the third interval;
providing the first driving current to the red LED module, providing the second driving current to the green LED module, and providing the third driving current to the blue LED module;
generating a third feedback voltage corresponding to the red LED module based on a third voltage drop corresponding to the red LED module;

generating a third set of CIE tristimulus values corresponding to the red LED module based on the third feedback voltage, the first feedback voltage, the second feedback voltage, the first set of CIE tristimulus values, and the second set of CIE tristimulus values corresponding to the red LED module;

generating a third feedback voltage corresponding to the green LED module based on a third voltage drop corresponding to the green LED module;

generating a third set of CIE tristimulus values corresponding to the green LED module based on the third feedback voltage, the first feedback voltage, the second feedback voltage, the first set of CIE tristimulus values, and the second set of CIE tristimulus values corresponding to the green LED module;

generating a third feedback voltage corresponding to the blue LED module based on a third voltage drop corresponding to the blue LED module;

generating a third set of CIE tristimulus values corresponding to the blue LED module based on the third feedback voltage, the first feedback voltage, the second feedback voltage, the first set of CIE tristimulus values, and the second set of CIE tristimulus values corresponding to the blue LED module;

calculating a first duty cycle control signal, a second duty cycle control signal, and a third duty cycle control signal based on the third set of CIE tristimulus values corresponding to the red LED module, the third set of CIE tristimulus values corresponding to the green LED module, the third set of CIE tristimulus values corresponding to the blue LED module, and a set of preset CIE tristimulus values; and regulating the first driving current based on the first duty cycle control signal, regulating the second driving current based on the second duty cycle control signal, and regulating the third driving current based on the third duty cycle control signal;

wherein the first interval, the second interval, and the third interval are not overlapped between each other.

21. The color control method of claim 20, wherein generating the first feedback voltage corresponding to the red LED module based on the first voltage drop corresponding to the red LED module is generating the first feedback voltage corresponding to the red LED module by performing a differential amplifying operation on the first voltage drop corresponding to the red LED module and a first reference voltage; generating the second feedback voltage corresponding to the red LED module based on the second voltage drop corresponding to the red LED module is generating the second feedback voltage corresponding to the red LED module by performing a differential amplifying operation on the second voltage drop corresponding to the red LED module and the first reference voltage; generating the first feedback voltage corresponding to the green LED module based on the first voltage drop corresponding to the green LED module is generating the first feedback voltage corresponding to the green LED module by performing a differential amplifying operation on the first voltage drop corresponding to the green LED module and a second reference voltage; generating the second feedback voltage corresponding to the green LED module based on the second voltage drop corresponding to the green LED module is generating the second feedback voltage corresponding to the green LED module by performing a differential amplifying operation on the second voltage drop corresponding to the green LED module and the second reference voltage; generating the first feedback voltage corresponding to the blue LED module based on the first voltage drop corresponding to the blue LED module is generating the first feedback voltage corresponding to the blue LED module by performing a differential amplifying operation on the first voltage drop corresponding to the blue LED module and a third reference voltage; generating the second feedback voltage corresponding to the blue LED module based on the second voltage drop corresponding to the blue LED module is generating the second feedback voltage corresponding to the blue LED module by performing a differential amplifying operation on the second voltage drop corresponding to the blue LED module and the third reference voltage; generating the third feedback voltage corresponding to the red LED module based on the third voltage drop corresponding to the red LED module is generating the third feedback voltage corresponding to the red LED module by performing a differential amplifying operation on the third voltage drop corresponding to the red LED module and a first reference voltage; generating the third feedback voltage corresponding to the green LED module based on the third voltage drop corresponding to the green LED module is generating the third feedback voltage corresponding to the green LED module by performing a differential amplifying operation on the third voltage drop corresponding to the green LED module and a second reference voltage; and generating the third feedback voltage corresponding to the blue LED module based on the third voltage drop corresponding to the blue LED module is generating the third feedback voltage corresponding to the blue LED module by performing a differential amplifying operation on the third voltage drop corresponding to the blue LED module and a third reference voltage.

22. The color control method of claim 20, wherein generating the first feedback voltage corresponding to the red LED module based on the first voltage drop corresponding to the red LED module is generating the first feedback voltage corresponding to the red LED module by performing a signal amplifying operation on the first voltage drop corresponding to the red LED module; generating the second feedback voltage corresponding to the red LED module based on the second voltage drop corresponding to the red LED module is generating the second feedback voltage corresponding to the red LED module by performing a signal amplifying operation on the second voltage drop corresponding to the red LED module; generating the first feedback voltage corresponding to the green LED module based on the first voltage drop corresponding to the green LED module is generating the first feedback voltage corresponding to the green LED module by performing a signal amplifying operation on the first voltage drop corresponding to the green LED module; generating the second feedback voltage corresponding to the green LED module based on the second voltage drop corresponding to the green LED module is generating the second feedback voltage corresponding to the green LED module by performing a signal amplifying operation on the second voltage drop corresponding to the green LED module; generating the first feedback voltage corresponding to the blue LED module based on the first voltage drop corresponding to the blue LED module is generating the first feedback voltage corresponding to the blue LED module by performing a signal amplifying operation on the first voltage drop corresponding to the blue LED module; generating the second feedback voltage corresponding to the blue LED module based on the second voltage drop corresponding to the blue LED module is generating the second feedback voltage corresponding to the blue LED module by performing a signal amplifying operation on the second voltage drop corresponding to the blue LED module; generating the third feedback voltage corresponding to the red LED module based on the third voltage drop corresponding to the red LED module is generating the third feedback voltage corresponding to the red LED module by performing a signal amplifying operation on the third voltage drop corresponding to the red LED module; generating the third feedback voltage corresponding to the green LED module based on the third voltage drop corresponding to the green LED module is generating the third feedback voltage corresponding to the green LED module by performing a signal amplifying operation on the third voltage drop corresponding to the green LED module; and generating the third feedback voltage corresponding to the blue LED module based on the third voltage drop corresponding to the blue LED module is generating the third feedback voltage corresponding to the blue LED module by performing a signal amplifying operation on the third voltage drop corresponding to the blue LED module.

23. The color control method of claim 20, wherein regulating the first driving current based on the first duty cycle control signal, regulating the second driving current based on the second duty cycle control signal, and regulating the third driving current based on the third duty cycle control signal is regulating the first driving current by regulating the duty cycle of a first PWM signal based on the first duty cycle control signal, regulating the second driving current by regulating the duty cycle of a second PWM signal based on the second duty cycle control signal, and regulating the third driving current by regulating the duty cycle of a third PWM signal based on the third duty cycle control signal.

24. The color control method of claim 20, further comprising:
generating a fourth feedback voltage corresponding to the red LED module based on a fourth voltage drop corresponding to the red LED module;
generating a fourth set of CIE tristimulus values corresponding to the red LED module based on the fourth feedback voltage, the first feedback voltage, the second feedback voltage, the first set of CIE tristimulus values, and the second set of CIE tristimulus values corresponding to the red LED module;
generating a fourth feedback voltage corresponding to the green LED module based on a fourth voltage drop corresponding to the green LED module;
generating a fourth set of CIE tristimulus values corresponding to the green LED module based on the fourth feedback voltage, the first feedback voltage, the second feedback voltage, the first set of CIE tristimulus values, and the second set of CIE tristimulus values corresponding to the green LED module;
generating a fourth feedback voltage corresponding to the blue LED module based on a fourth voltage drop corresponding to the blue LED module;
generating a fourth set of CIE tristimulus values corresponding to the blue LED module based on the fourth feedback voltage, the first feedback voltage, the second feedback voltage, the first set of CIE tristimulus values, and the second set of CIE tristimulus values corresponding to the blue LED module;
calculating a fourth duty cycle control signal, a fifth duty cycle control signal, and a sixth duty cycle control signal based on the fourth set of CIE tristimulus values corresponding to the red LED module, the fourth set of CIE tristimulus values corresponding to the green LED module, the fourth set of CIE tristimulus values corresponding to the blue LED module, and the set of preset CIE tristimulus values; and
regulating the first driving current based on the fourth duty cycle control signal, regulating the second driving current based on the fifth duty cycle control signal, and regulating the third driving current based on the sixth duty cycle control signal.

25. The color control method of claim 24, wherein regulating the first driving current based on the fourth duty cycle control signal, regulating the second driving current based on the fifth duty cycle control signal, and regulating the third driving current based on the sixth duty cycle control signal is regulating the first driving current by regulating the duty cycle of a first PWM signal based on the fourth duty cycle control signal, regulating the second driving current by regulating the duty cycle of a second PWM signal based on the fifth duty cycle control signal, and regulating the third driving current by regulating the duty cycle of a third PWM signal based on the sixth duty cycle control signal.

* * * * *